US012111597B2

(12) United States Patent
Watanabe et al.

(10) Patent No.: US 12,111,597 B2
(45) Date of Patent: Oct. 8, 2024

(54) IMAGE FORMING APPARATUS AND NON-TRANSITORY RECORDING MEDIUM STORING A COMPUTER READABLE CONTROL PROGRAM

(71) Applicant: Konica Minolta, Inc., Tokyo (JP)

(72) Inventors: Wataru Watanabe, Hachioji (JP); Ryoei Ikari, Tokorozawa (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 18/366,961

(22) Filed: Aug. 8, 2023

(65) Prior Publication Data

US 2024/0085841 A1 Mar. 14, 2024

(30) Foreign Application Priority Data

Sep. 1, 2022 (JP) ................................ 2022-139043

(51) Int. Cl.
*G03G 15/08* (2006.01)
*G03G 15/00* (2006.01)

(52) U.S. Cl.
CPC ....... *G03G 15/556* (2013.01); *G03G 15/0849* (2013.01); *G03G 2215/0888* (2013.01)

(58) Field of Classification Search
CPC ......................... G03G 15/556; G03G 15/0849
USPC ................................................ 399/9, 24, 27
See application file for complete search history.

(56) References Cited

U.S. PATENT DOCUMENTS 9,599,924 B2 * 3/2017 Mandai .............. G03G 15/0907
2011/0123206 A1 5/2011 LeStrange et al.

FOREIGN PATENT DOCUMENTS

JP 2011-113089 A 6/2011
JP 2014-178593 A 9/2014
JP 2015-230367 A 12/2015

* cited by examiner

*Primary Examiner* — Hoan H Tran
(74) *Attorney, Agent, or Firm* — LUCAS & MERCANTI, LLP

(57) ABSTRACT

The image forming apparatus includes an image bearing member, a developing section, and a controller that functions as a sign detector, a charge amount measurement section, and a charge amount adjuster. On the image bearing member, an electrostatic latent image is formed based on image data. The developing section contains a developer, and develops the electrostatic latent image formed on the image bearing member with the developer to form a toner image. The sign detector detects a sign that the charge amount of the developer contained in the developing section changes. The charge amount measurement section measures the charge amount of the developer in accordance with the detection result by the sign detector. The charge amount adjuster adjusts the charge amount of the developer according to the measurement result by the charge amount measurement section.

10 Claims, 14 Drawing Sheets

IMAGE FORMING APPARATUS AND NON-TRANSITORY RECORDING MEDIUM STORING A COMPUTER READABLE CONTROL PROGRAM

CROSS-REFERENCE TO RELATED APPLICATION

Japanese patent application No. 2022-139043 filed on Sep. 1, 2022, including description, claims, drawings, and abstract the entire disclosure is incorporated herein by reference in its entirety.

BACKGROUND

1. Technological Field

The present invention relates to an image forming apparatus and a non-transitory recording medium storing a computer readable control program.

2. Description of the Related Art

In an image forming apparatus, a developing device contains a developer and develops an electrostatic latent image formed on a photoreceptor with the developer to form a toner image. The developer may be, for example, a two-component developer including a toner and a carrier. The toner, which includes charged colored fine particles, adheres to the electrostatic latent image on the photoreceptor to play a role in developing. On the other hand, the carrier, which includes fine particles, contains a magnetic material and plays a role in carrying and conveying the toner to the photoreceptor by rotation of a developing roller of a developing device and charging the toner by stirring with the toner.

The charge amount of the developer contained in the developing device changes (increases or decreases) according to the operational status of the image forming apparatus and the level of the document coverage based on the document image. For example, the charge amount of the developer increases while the image forming apparatus is printing an image with the medium to high document coverage, but the charge amount of the developer may decrease when a state in which printing with the low document coverage continues or a state in which printing is not performed continues.

Typically, when the charge amount of the developer contained in the developing device is small, the possibility that the toner dispersion amount increases becomes higher. In such a case, the sheet on which an image is printed, a sheet conveyance path, and the like may be contaminated with the dispersed toner (toner contamination) frequently. The developing device is supplied with an amount of toner corresponding to the level of the document coverage. In a case where the charge amount of the developer contained in the developing device is very large or very small with respect to the charge amount of the supplied toner, that is, in a case where the charge amounts of the supplied toner and of the developer are biased in opposite directions, a difference in fluidity of the developer may occur due to the difference in the charge amount, as compared with a case where the charge amounts are not biased. As a result, the developer contained in the developing device and the supplied toner are less liable to be mixed with each other than the case where the charge amounts are not biased. This may increase the toner dispersion amount.

In addition to the level of the document coverage, the charge amount of the developer contained in the developing device may change due to a change in the surrounding environment of the image forming apparatus, for example, a rapid change in relative humidity due to the influence of cooling in summer or heating in winter. The fluidity of the developer changes in response to a change in the surrounding environment of the image forming apparatus, thereby the developer and the supplied toner may be less liable to be mixed with each other.

Then, once the fluidity of the developer is changed and the developer and the supplied toner are less liable to be mixed with each other, it is not easy to return this state to its original state. In order to return the state to its original state, for example, it is necessary for the image forming apparatus to repeatedly perform a sheet passing test using an image with the moderately high document coverage to stabilize the state of the developer, which takes a lot of time and effort.

In relation to this, a technique relating to Q/M measurement in which a charge amount is measured from a toner layer electric potential using an electric potential sensor is known (see, for example, JP 2011-113089 A). In addition, it is disclosed that a charge amount is used as an input to control components of an image forming apparatus (see, for example, JP 2014-178593 A and JP 2015-230367 A).

However, with the technique according to JP 2011-113089 A, it is difficult to immediately detect a change when the charge amount of the developer has changed, and thus the charge amount may not be accurately measured. Thus, a toner dispersion amount may increase even if the charge amount is adjusted according to a measurement result of the charge amount of the developer. In contrast, it is considered to increase the frequency of measurement of the charge amount in order to accurately detect a charge amount of the developer. However, the measurement of the charge amount is typically not performed during normal printing, so that it is necessary to temporarily stop processing of normal printing when measurement of the charge amount is performed. As a result, productivity of normal printing by an image forming apparatus, that is, the ratio between the number of prints that can be theoretically output per unit time and the number of prints that can be actually output by the image forming apparatus per unit time decrease.

The present invention has been made in view of the above-described issues. Thus, an object of the present invention is to provide an image forming apparatus and a non-transitory recording medium storing a computer readable control program capable of suppressing a decrease in productivity of normal printing while suppressing toner dispersion.

SUMMARY

To achieve at least one of the abovementioned objects, according to an aspect of the present invention, an image forming apparatus reflecting one aspect of the present invention includes an image bearing member on which an electrostatic latent image is formed based on image data, a developing section that contains a developer and develops the electrostatic latent image formed on the image bearing member with the developer to form a toner image, and a hardware processor that detects a sign that a charge amount of the developer contained in the developing section changes, measures the charge amount of the developer in accordance with a detection result; and adjusts a charge amount change of the developer according to a measurement result.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
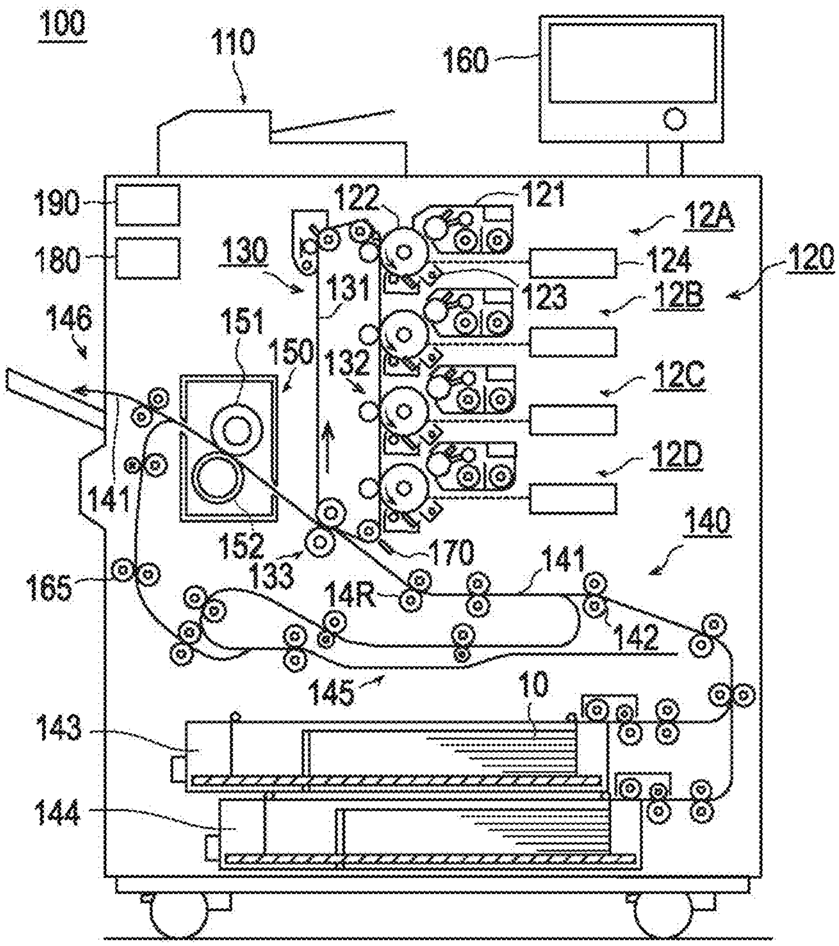
FIG. 1 is a schematic view illustrating an example of an overall configuration of an image forming apparatus according to an embodiment of the present invention.

Hereinafter, an embodiment of the present invention will be described with reference to the drawings. Note that in the drawings, the same elements are denoted by the same reference signs, and redundant description thereof will be omitted. In addition, dimensional ratios in the drawings are exaggerated for convenience of description and may be different from actual ratios.

<Image Forming Apparatus 100>

Figure 2:
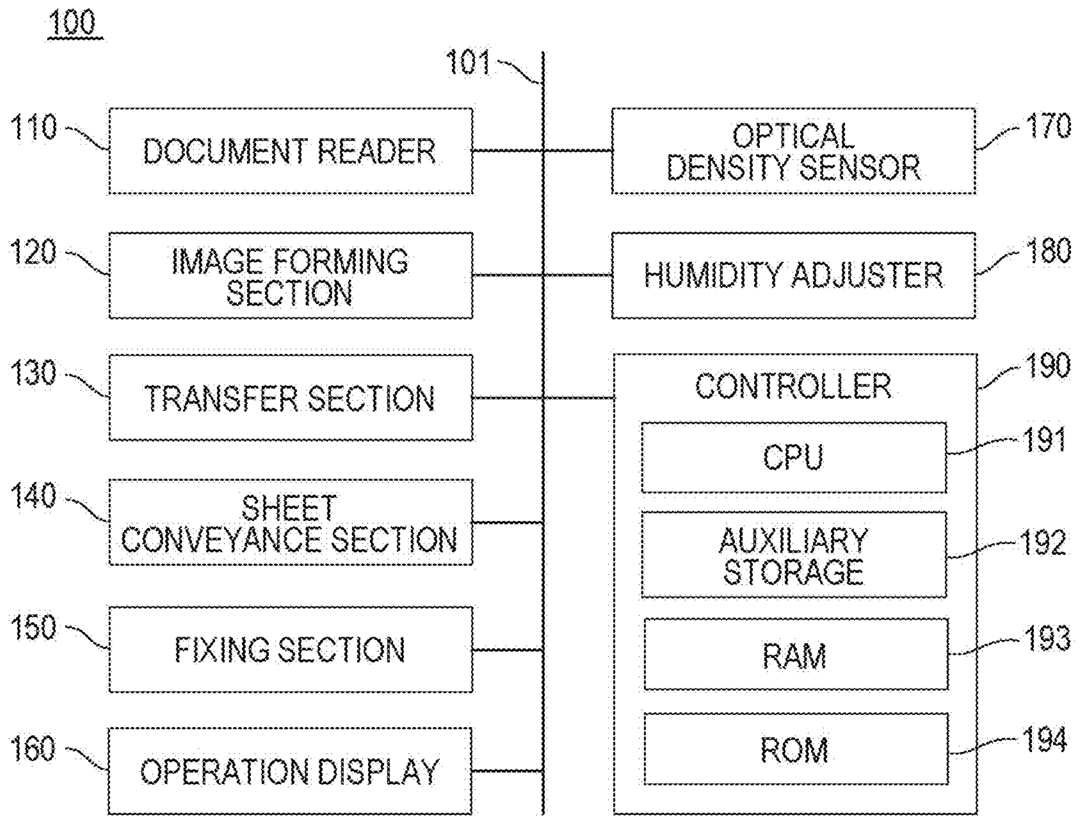
FIG. 2 is a schematic block diagram illustrating an example of an overall configuration of the image forming apparatus according to an embodiment of the present invention.

FIGS. 1 and 2 are a schematic view and a schematic block diagram, respectively, illustrating an example of an overall configuration of an image forming apparatus 100 according to an embodiment of the present invention.

The image forming apparatus 100 illustrated in FIG. 1 is a dry electrophotographic image forming apparatus. The image forming apparatus 100 uses image data of a scanned document or image data generated based on a print job received from an external client terminal. The image forming apparatus 100 forms (prints) an image on a sheet 10, which is a recording medium, using the above-described image data. The image forming apparatus 100 can be, for example, a copier, a printer, a facsimile, or an MFP including a copy function, a printer function, and a scanning function.

The image forming apparatus 100 includes a document reader 110, an image forming section 120, a transfer section 130, a sheet conveyance section 140, a fixing section 150, an operation display 160, an optical density sensor 170, a humidity adjuster 180, and a controller 190.

<Document Reader 110>

The document reader 110 applies light from a light source to a document that is set at a predetermined reading position on a document table or a document that is conveyed to a predetermined reading position by an auto document feeder (ADF) and photoelectrically converts the reflected light by a light receiving element such as a charge coupled device (CCD) image sensor or a complementary metal oxide semiconductor (CMOS) linear sensor to generate an electric signal. The generated electric signal is subjected to analog to digital (A/D) conversion, shading correction, filter processing, image compression processing, and the like and is transmitted to the image forming section 120.

<Image Forming Section 120>

The image forming section 120 forms a toner image on a photosensitive drum 122 as an image bearing member, based on the image data. The image forming section 120 includes an image forming unit 12A, an image forming unit 12B, an image forming unit 12C and an image forming unit 12D. The image forming unit 12A forms a toner image of the color of yellow (Y). The image forming unit 12B forms a toner image of the color of magenta (M). The image forming unit 12C forms a toner image of the color of cyan (C). The image forming unit 12D forms a toner image of the color of black (K).

Figure 3:
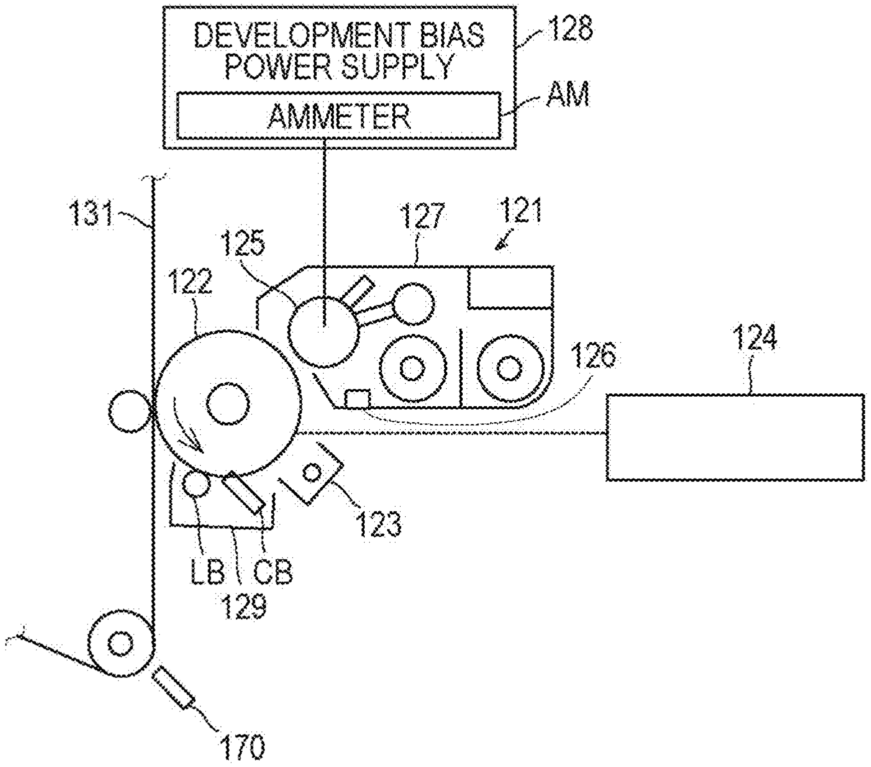
FIG. 3 is a schematic configuration diagram for illustrating details of an image forming section illustrated in FIG. 1.

FIG. 3 is a schematic configuration diagram for illustrating details of the image forming section 120 illustrated in FIG. 1. Each image forming unit in the image forming section 120 includes a developing device 121, the photosensitive drum 122, a charging section 123, an optical writing section 124, a developing bias power supply 128, and a cleaning section 129. The developing device 121 functions as a developing section and causes the toner to adhere to the surface of the photosensitive drum 122, visualizing the electrostatic latent image with the toner to form a toner image. That is, monochrome toner images corresponding to the colors of yellow, magenta, cyan, and black are formed on the photosensitive drums 122 of the image forming units 12A, 12B, 12C, and 12D, respectively.

The developing devices 121 in the respective image forming units 12A to 12D each contain a two-component developer including the toner of each colors of yellow, magenta, cyan, and black having a small particle diameter, and the carrier. The carrier includes ferrite particles as a core around which an insulating resin is coated. The toner includes polyester as a main material, and a coloring agent such as a pigment, carbon black or the like, a charge control agent, silica, titanium oxide, and the like are added thereto. The carrier has the particle diameter of 10 to 50 μm and the saturation magnetization of 10 to 80 emu/g. The toner has the particle diameter of 4 to 10 μm. The charging characteristic of the toner is a negative charging characteristic, and the average charge amount is −20 to −60 μC/g. As the two-component developer, a mixture of these carrier and toner is used with the toner concentration of 5 to 10% by mass.

The developing device 121 is configured to be supplied with a carrier and a toner from a carrier cartridge and a toner cartridge (neither illustrated), respectively, through a developer supply port (not illustrated). Note that although not illustrated, the image forming apparatus 100 includes a carrier supply mechanism and a toner supply mechanism. The carrier supply mechanism supplies the carrier from the carrier cartridge to the developing device 121. The toner supply mechanism supplies the toner from the toner cartridge to the developing device 121. In addition, the present invention is not limited to the configuration in which the carrier and the toner are separately supplied, and may be configured such that the carrier and the toner are supplied to the developing device 121 in a state of being mixed in advance. The developing device 121 is connected to an external waste developer storage container (not illustrated) via a developer discharge section (not illustrated). The developing device 121 is configured to be able to discharge (discard) the developer contained in the developing device 121.

A toner weight ratio of the developer contained in the toner cartridge is greater than a toner weight ratio of the developer contained in the developing device 121. Thus, by adjusting the amount of the developer to be supplied, the toner weight ratio of the developer contained in the developing device 121 can be maintained constant. In addition, the toner weight ratio of the developer contained in the developing device 121 can be changed (increased) as necessary. In addition, it is also possible to replace the developer contained in the developing device 121.

The developing device 121 includes a developing roller 125, a toner concentration sensor 126, and a developing case 127. The developing roller 125 is arranged parallel to the photosensitive drum 122 in the developing case 127, and bears and conveys the developer contained in the developing case 127. The developing roller 125 is arranged in close proximity to the peripheral surface of the photosensitive drum 122 via an opening of the developing case 127, and is rotationally driven in a direction opposite to the rotation of the photosensitive drum 122. The developing device 121 includes a developing roller driving mechanism (not illustrated) that rotationally drives the developing roller 125 in accordance with a command from the controller 190.

The developing roller 125 includes a rotatable developing sleeve and a fixed magnet roller that generates a magnetic field. A voltage obtained by superimposing a direct current voltage on an alternating current voltage is applied to the developing sleeve from the developing bias power supply 128. For example, the rotational speed of the developing roller 125 may be 200 to 1000 mm/sec as the linear velocity of the outer peripheral surface thereof.

The toner concentration sensor 126 is, for example, a permeability sensor that measures the toner concentration Tc utilizing the fact that the permeability of the developer changes according to the toner concentration Tc. The toner concentration sensor 126 is not limited to the permeability sensor.

The photosensitive drum 122 is the image bearing member including a photosensitive layer that is formed of resin such as polycarbonate and includes an organic photo conductor (OPC), and is configured to rotate at a predetermined speed. The charging section 123 includes a corona discharge electrode arranged around the photosensitive drum 122 and charges the surface of the photosensitive drum 122 with generated ions. The optical writing section 124 includes a scanning optical device, and exposes the photosensitive drum 122 that has been charged based on the image data. As a result, the electric potential of a portion that has been exposed decreases, thereby a charge pattern (that is, an electrostatic latent image) corresponding to the image data is formed.

The developing bias power supply 128 applies the voltage obtained by superimposing a direct current voltage on an alternating current voltage to a developing sleeve of the developing roller 125. The developing bias power supply 128 outputs, to the developing roller 125, a developing bias of an AC voltage of 0.2 to 2.0 kVp-p (a frequency of 2 to 7 kHz) and a DC voltage of −200 to −700 V. The developing bias power supply 128 includes an ammeter AM. The ammeter AM measures a current (developing current) flowing between the developing roller 125 of the developing device 121 and the photosensitive drum 122 and inputs the current to the controller 190.

The cleaning section 129 includes a cleaning blade CB and a lubricant application brush LB. The cleaning blade CB scrapes (removes) a residue such as a toner remaining on the surface of the photosensitive drum 122, thereby maintaining a good state of the surface of the photosensitive drum 122. The lubricant application brush LB rotates being in contact with the surface of the photosensitive drum 122 to apply lubricant to the photosensitive drum 122. The lubricant application brush LB is pressed against the surface of the photosensitive drum 122 by a spring (not illustrated). The cleaning section 129 includes a lubricant application brush driving mechanism (not illustrated) that rotationally drives the lubricant application brush LB in accordance with a command from the controller 190.

<Transfer Section 130>

The transfer section 130 transfers a toner image on the photosensitive drum 122 onto the sheet 10. The transfer section 130 includes an intermediate transfer belt 131, a primary transfer section 132, and a secondary transfer section 133. The intermediate transfer belt 131, which has an endless shape, is arranged in the lateral of each of the image forming units 12A to 12D, and is positioned so as to be in contact with the photosensitive drums 122. The intermediate transfer belt 131 is formed of, for example, a polyimide film. Monochrome toner images formed in the image forming units 12A to 12D are sequentially transferred onto the intermediate transfer belt 131 by the primary transfer section 132. As a result, a color toner image is formed in which layers of yellow, magenta, cyan, and black are superimposed. The secondary transfer section 133 transfers the color toner image formed on the intermediate transfer belt 131 onto the sheet 10 that has been conveyed.

<Sheet Conveyance Section 140>

The sheet conveyance section 140 includes a sheet conveyance path 141 for conveying the sheet 10 and a plurality of conveyance roller pairs 142 and conveys the sheet 10 in the image forming apparatus 100. Further, the sheet conveyance section 140 includes a sheet reversing section 145.

The sheet reversing section 145 conveys the sheet 10, on the surface of which the toner image is fixed by the fixing section 150, toward the image forming section 120 through the sheet conveyance path 141. In addition, the sheet reversing section 145 reverses the front and back of the sheet 10 to enable the image forming section 120 to form a toner image on the back surface opposite to the front surface.

In sheet feed trays 143 and 144, for example, the sheets 10 are stored for each sheet size. The sheets 10 are fed one by one to the sheet conveyance section 140. The sheet 10 fed from the sheet feed trays 143 and 144 is conveyed along the sheet conveyance path 141 by the plurality of conveyance roller pairs 142 being rotationally driven by a driver (a motor not illustrated). The sheet 10 is conveyed to the secondary transfer section 133 through a registration roller 14R. Then, the sheet 10, onto which a toner image has been transferred at the secondary transfer section 133, is conveyed to the fixing section 150.

<Fixing Section 150>

The fixing section 150 fixes a formed toner image to the sheet 10. The fixing section 150 includes a heating roller 151 that is hollow and includes a heater therein and a pressing roller 152 that comes into pressure contact with the heating roller 151. The heating roller 151 and the pressing roller 152, which are controlled to be at a predetermined temperature (for example, 100° C. or more) by the heater, applies heating and pressing treatment to the sheet 10 to fix a toner image thereto.

In a case of single-sided printing, the sheet 10 to which the toner image has been fixed is ejected from a sheet ejection section 146 to the outside of the image forming apparatus 100 through the sheet conveyance path 141. On the other hand, in a case of double-sided printing, a toner image is transferred onto the back surface of the sheet 10 in the secondary transfer section 133 and the toner image on the back surface is fixed in the fixing section 150. Then, the sheet 10 is ejected from the sheet ejection section 146 to the outside of the image forming apparatus 100.

<Operation Display 160>

The operation display 160 receives an instruction from a user and displays a message or the like to the user on a screen. The operation display 160 includes a keyboard and an operation panel. The user inputs an instruction to the controller 190 by operating the keyboard or the operation panel. In addition, input information, various kinds of setting information, a warning message, and the like are displayed on the screen.

<Optical Density Sensor 170>

The optical density sensor 170, which is arranged on the downstream side in a rotation direction of the intermediate transfer belt 131 with respect to the photosensitive drum 122, measures optical density of the toner image transferred onto the intermediate transfer belt 131 and inputs the measurement result to the controller 190. The optical density sensor 170 includes a light emitter and a light receiver. The light emitter emits light toward the intermediate transfer belt 131, and the light receiver receives the reflected light from the intermediate transfer belt 131. The optical density sensor 170 measures the optical density of the toner image on the intermediate transfer belt 131 based on the intensity of the light received by the light receiver.

<Humidity Adjustor 180>

The humidity adjuster 180 includes humidity sensors, a humidifier, and a dehumidifier (none of which are illustrated), and controls relative humidity in the image forming apparatus 100. The humidity sensors, which functions as a relative humidity measurement section, measure the relative humidity in the image forming apparatus 100, and input the measurement result to the controller 190. The humidifier humidifies the interior of the image forming apparatus 100 in accordance with an instruction from the controller 190. In addition, the dehumidifier dehumidifies the interior of the image forming apparatus 100 in accordance with an instruction from the controller 190.

More specifically, the humidity sensor is arranged in the vicinity of each of the four developing devices 121 corresponding to the colors of yellow, magenta, cyan, and black, and is configured to constantly monitor the relative humidity in the developing device 121 of each toner color, including during printing. In the vicinity of the developing device 121 of each toner color, a duct for transporting the air discharged from the humidifier or the dehumidifier to each developing device 121 and a shutter for blocking the transportation of the air are provide for each toner color. The controller 190 can control the relative humidity in each developing device 121 independently by controlling the opening and closing of the shutter for each toner color to adjust the volume of the air transported to each developing device 121.

<Controller 190>

The controller 190 integrally controls the document reader 110, the image forming section 120, the transfer section 130, the sheet conveyance section 140, the fixing section 150, the operation display 160, the optical density sensor 170, and the humidity adjuster 180 to implement various functions of the image forming apparatus 100.

The controller 190 includes a central processing unit (CPU) 191, an auxiliary storage 192, a random access memory (RAM) 193, and a read only memory (ROM) 194, and these components are connected to each other via an internal bus.

The CPU 191 executes a control program to control each section of the image forming apparatus 100. The auxiliary storage 192 stores therein a conversion table for converting the value of the optical density measured by the optical density sensor 170 into the toner adhesion amount (mass per unit area), an operating system, various application programs, a control program, and the like.

The RAM 193 temporarily stores therein a result of the arithmetic processing by the CPU 191, image data, and the like. The ROM 194 stores therein various parameters used by the CPU 191 in arithmetic processing and the like.

In addition, the controller 190 includes a network interface (not illustrated) for communicating with a device such as a client terminal connected to a network, to acquire a print job from the client terminal via the network interface. The print job includes print data and print setting information.

(Functions of Controller 190)

The controller 190 can implement various functions by the CPU 191 executing the control program. Hereinafter, the functions of the controller 190 according to the present embodiment will be described below.

[Image Processing Section and Image Data Acquisition Section]

The controller 190 functions as an image processing section to perform rasterization processing on print data included in a print job. The image processing section performs image processing for gamma correction, screen correction, and density balance on raster-format image data subjected to the rasterization processing. In addition, the image processing section performs image processing related to two-dimensional position correction such as main/sub-scanning positions, main/sub-scanning magnifications, tilt correction, and curvature correction using the color shift correction amount. In addition, the controller 190 functions as an image data acquisition section to acquire image data subjected to the image processing.

[Calculation of Document Coverage and Average Value and Standard Deviation Thereof]

The controller 190 functions as a coverage calculation section to calculate document coverage for each page of a document image (document image printed on one sheet 10) based on the image data acquired by the image data acquisition section and store the calculated document coverage in the RAM 193.

In addition, the controller 190 functions as a data calculation section. Based on the document coverage calculated for a plurality of pages (document coverage data), the data calculation section can calculate an average value of the document coverage per prescribed number of pages, a variation width (maximum value—minimum value) of the average coverage, and a standard deviation of the document coverage data. The prescribed number of pages is, for example, 10 pages. Hereinafter, the average value of the document coverage per prescribed number of pages (for example, 10 pages) is referred to as an "average coverage". For example, the data calculation section sets page sections for an image data to calculate, for each page section, at least one of the average coverage, the variation width of the average coverage, and the standard deviation of document coverage data, and store the calculation result in the RAM 193. For example, according to the present embodiment, the average coverage, the variation width, and the standard deviation of document coverage data may be constant during one section.

[Detection of Sign That Charge Amount of Developer Changes]

According to the present embodiment, in order to measure the charge amount at the timing when a change in the charge amount of the developer contained in the developing device 121 is expected, a sign that the charge amount changes is detected.

The controller 190 functions as a sign detector to detect a sign that the charge amount of the developer changes. For example, a change in the charge amount of the developer is expected in a case where at least one of the following charge amount measurement execution conditions (1-1) to (1-4) is satisfied.

(1-1) when a state in which the average coverage is less than a predetermined first threshold value and the variation width of the average coverage is equal to or less than a predetermined second threshold value continues for a predetermined number of pages.

(1-2) when a state in which the average coverage is less than the predetermined first threshold value and the standard deviation of the document coverage data is equal to or less than a predetermined third threshold value continues for the predetermined number of pages.

(1-3) When a state in which the above (1-1) and (1-2) are combined continues for the predetermined number of pages.

(1-4) When a change (an amount of change) of the relative humidity (measurement result of the humidity sensor) in the image forming apparatus 100 is equal to or greater than a predetermined fourth threshold value.

For example, the first threshold value may be 20 [%], the second threshold value may be 3 [%], the third threshold value may be 0.4 [%], and the fourth threshold value may be 5 [%].

The controller 190 measures the charge amount of the developer in a case where at least one of the above-described execution conditions (1-1) to (1-4) is satisfied, and adjusts the charge amount of the developer (adjusts a change in the charge amount) according to the measurement result. In addition, in a case where none of the execution conditions (1-1) to (1-4) is not satisfied, the controller 190 omits the measurement of the charge amount of the developer. That is, only in a case where any of the execution conditions is satisfied, the controller 190 performs the measurement of the charge amount of the developer.

[Detection of Sign that Charge Amount Returns to Original State]

After starting the adjustment of the charge amount of the developer contained in the developing device, the controller 190 detects a sign that the direction in which the charge amount changes reverses to the opposite direction and that the charge amount of the developer returns to its original state. For example, the charge amount is expected to return to its original state in a case where at least any one of the following charge amount measurement execution conditions (2-1) and (2-2) is satisfied. More specifically, as a result of the measurement of the charge amount of the developer, the controller 109 detects a decrease in the charge amount, and then starts the adjustment of the charge amount. After that, the controller 109 detects a sign that the direction in which the charge amount changes reverses from a decrease to an increase and that the charge amount of the developer returns to its original state.

(2-1) when a state in which the variation width of the average coverage is greater than the predetermined second threshold value continues for the predetermined number of pages.

(2-2) when a state in which the standard deviation of the document coverage data is greater than the third threshold value continues for the predetermined number of pages.

In a case where at least any one of the above-described charge amount measurement execution conditions (2-1) and (2-2) is satisfied, the controller 190 may re-measure the charge amount of the developer and change the adjustment of the charge amount of the developer according to the measurement result. That is, the controller 190 re-adjusts the charge amount according to the re-measurement result of the charge amount.

[Measurement of Charge Amount of Developer]

According to the present embodiment, the controller 190, the ammeter AM, and the optical density sensor 170 cooperate to function as a charge amount measurement section. When detecting a sign that the charge amount of the developer changes or a sign that the charge amount returns to its original state, the charge amount measurement section measures a toner charge amount Q/M of each toner color as the charge amount of the developer. More specifically, the charge amount measurement section controls any of the image forming units 12A to 12D corresponding to one toner color of yellow, magenta, cyan, and black to form a band-shaped toner image (for example, a solid band image) extending in the main scanning direction. The charge amount measurement section measures a developing current with the ammeter AM and measures the optical density of the toner image with the optical density sensor 170.

The developing current is a current generated when the toner moves from the surface of the developing roller 125 to the surface of the photosensitive drum 122 at the time of development. The developing current is proportional to the total amount of charges of the toner moved per unit time, so that the charge amount measurement section can calculate the total amount of charges of the toner by measuring the developing current.

In addition, the charge amount measurement section converts the value of the optical density measured by the optical density sensor 170 into a toner adhesion amount (mass per unit area) using the conversion table stored in advance in the auxiliary storage 192. The charge amount measurement section calculates a total adhesion amount (mass) of the toner image based on the above-described toner adhesion amount.

Then, the charge amount measurement section calculates the toner charge amount Q/M (a charge amount per unit adhesion amount of toner) based on the total amount of charges and the total adhesion amount. The charge amount measurement section sequentially and continuously performs the above-described series of processing from the formation of a toner image to the calculation of the toner charge amount Q/M for each toner color, measuring the toner charge amounts for all of the toner colors. The calculated toner charge amount is stored in the RAM 193 together with information including the measurement time and the number of prints (cumulative value).

The charge amount measurement section may be configured to measure the charge amount even in a case other than when detecting a sign that the charge amount of the developer changes or a sign that the charge amount returns to its original state. For example, the charge amount measurement section may be configured to measure the charge amount immediately after the image forming apparatus 100 is powered on, immediately after printing is started, immediately after the developer in the developing device 121 is replaced with a new one, at the time of inspection or maintenance, or at any timing set by the user. The time of inspection or maintenance is the time of inspection or maintenance of the image forming apparatus 100 by a service technician.

than a predetermined first differential value. For example, when the difference between the current measurement result and the previous measurement result is equal to or greater than the first differential value, the charge amount adjuster adjusts the charge amount of the developer to make the difference smaller in the next charge amount measurement. That is, the charge amount adjuster adjusts the charge amount to change in a direction opposite to a direction in which the charge amount has changed.

In the first charge amount measurement, for example, the measurement result of the charge amount measurement performed immediately after the developer in the developing device 121 is replaced with a new one may be used as the previous measurement result (reference measurement result). Alternatively, the measurement result of the charge amount measurement performed after the service technician confirms that the state of the image forming apparatus 100 is good at the time of inspection or maintenance of the image forming apparatus 100 may be used as the previous measurement result. Alternatively, the measurement result of the charge amount measurement performed at any timing by the user (operator) may be used as the previous measurement result. Note that when the user performs the charge amount measurement at any timing, it is desirable that the image forming apparatus 100 be in a stable state. The stable state is a state in which there is no significant change in the document coverage data acquired by the image forming apparatus 100 or in the environment around the image forming apparatus 100, and the image forming apparatus 100 is not stopped for a long period of time or is not operated excessively continuously.

According to the present embodiment, the charge amount adjustment of the developer may be performed, for example, by the following adjustment methods (a) to (d).

TABLE 1

| | Change in Charge Amount | | |
|---|---|---|---|
| Charge Amount Adjustment Mean | Increase | Decrease | No Change |
| (a) Toner Concentration Tc | Raising Tc | Reducing Tc | No Change |
| (b1) Toner Amount for Development (Development θ) | Raising Development θ | Reducing Development θ | No Change |
| (b2) Toner Amount for Development (Developing AC Bias) | Raising Developing AC Bias | Reducing Developing AC Bias | No Change |
| (c) Relative Humidity | Raising Relative Humidity | Reducing Relative Humidity | No Change |
| (d) Lubricant Application Brush θ | Raising Lubricant Application Brush θ | Reducing Lubricant Application Brush θ | No Change |

[Adjustment of Charge Amount of Developer]

According to the present embodiment, the controller 190 functions as a charge amount adjuster. More specifically, the controller 190 cooperates with the toner supply section, the driver of the developing device 121, the humidity adjuster 180, and the like to function as a charge amount adjuster. The charge amount adjuster adjusts the charge amount of the developer contained in the developing device 121 according to the measurement result of the charge amount measurement section. More specifically, the charge amount adjuster may adjust the charge amount (a change in the charge amount) according to the change (increase or decrease) in the charge amount measured by the charge amount measurement section. For example, the charge amount adjuster compares a current measurement result by the charge amount measurement section with the previous measurement result, and adjusts the charge amount of the developer when a difference between the current measurement result and the previous measurement result is equal to or greater (a) Change (Raise/Reduction) of Toner Concentration Tc The charge amount of the developer can be adjusted by changing the toner concentration Tc of the developer contained in the developing device 121. The controller 190 measures the toner concentration Tc and changes the toner concentration Tc based on the measurement result. The toner concentration Tc reflects the amount of a toner consumption, so that the controller 190 may use the toner concentration Tc as a parameter for controlling the amount of toner to be supplied from the toner cartridge to the developing device 121.

For example, when the measured toner concentration Tcm is less than a set target value, the controller 190 controls the supply mechanism to supply the toner in the amount corresponding to the difference between the target value and the toner concentration Tcm. Meanwhile, the controller 190 is configured to stop the supply of the toner when the measured toner concentration Tcm exceeds the target value. As described above, the toner concentration Tc is feedback-controlled using the measurement result of the toner concentration Tc of the developer contained in the developing device 121. In this manner, the toner concentration Tc can be brought close to the target value, and the toner concentration Tc can be changed by newly setting a target value for the measured toner concentration Tcm.

The charge amount adjuster raises the toner concentration Tc when the charge amount is increasing. By setting the target value to a value greater than the measured toner concentration Tcm to raise the toner concentration Tc, the amount of unused toner to be supplied to the developing device 121 increases and thus the charge amount decreases. On the other hand, the charge amount adjuster reduces the toner concentration Tc when the charge amount is decreasing. By setting the target value to a value less than the measured toner concentration Tcm to reduce the toner concentration Tc, the amount of toner to be supplied to the developing device 121 decreases, and thus the charge amount increases. In addition, when there is no change in the charge amount, the toner concentration Tc is not changed.

Alternatively, the charge amount adjuster may be configured to set the amount of change from the toner concentration Tcm to a positive value when raising the toner concentration Tc, and to set the amount of change from the toner concentration Tcm to a negative value when reducing the toner concentration Tc.

(b) Change (Raise/Reduction) of Toner Amount for Development onto Photosensitive Drum (Image Bearing Member) 122

(b1) Change of Development θ

By changing development θ, the toner amount for development can be changed to adjust the charge amount of the developer. The development θ is a ratio of a rotational speed (linear velocity) between the developing roller 125 and the photosensitive drum 122. When the development θ is raised, the toner amount for development onto the photosensitive drum 122 is raised. The toner supply amount to the developing device 121 also increases accordingly, so that the charge amount decreases. On the other hand, when the development θ is reduced, the toner amount for development onto the photosensitive drum 122 is reduced. The toner supply amount to the developing device 121 also decreases accordingly, so that the charge amount increases.

The charge amount adjuster decreases the charge amount by raising the development θ when the charge amount is increasing. Meanwhile, the charge amount adjuster increases the charge amount by reducing the development θ when the charge amount is decreasing. In addition, when there is no charge in the charge amount, the development θ is not changed.

(b2) Change (Raise/Reduction) of Toner Amount for Development by Change of Developing AC Bias By changing developing AC bias, the toner amount for development can be changed to adjust the charge amount of the developer. When the developing AC bias is raised, the toner amount for development onto the photosensitive drum 122 is raised. The toner supply amount to the developing device 121 also increases accordingly, so that the charge amount decreases. On the other hand, when the developing AC bias is reduced, the toner amount for development onto the photosensitive drum 122 is reduced. The toner supply amount to the developing device 121 also decreases accordingly, so that the charge amount increases.

The charge amount adjuster decreases the charge amount by raising the developing AC bias when the charge amount is increasing. Meanwhile, the charge amount adjuster increases the charge amount by reducing the developing AC bias when the charge amount is decreasing. In addition, when there is no change in the charge amount, the developing AC bias is not changed.

(c) Change of Relative Humidity by Operation Control of Humidifier and Dehumidifier By controlling operations of the humidifier and the dehumidifier to change the relative humidity in the image forming apparatus 100, the charge amount of the developer can be adjusted. As the relative humidity in the image forming apparatus 100 increases, the charge amount of the developer decreases, and as the relative humidity decreases, the charge amount of the developer increases.

The charge amount adjuster decreases the charge amount of the developer by raising the relative humidity when the charge amount of the developer is increasing. Meanwhile, the charge amount adjuster increases the charge amount of the developer by reducing the relative humidity when the charge amount of the developer is decreasing.

The relative humidity in the image forming apparatus 100 can be raised by, for example, activating the humidifier when the humidifier is stopped, or increasing the humidification by the humidifier when the humidifier is already operating. Alternatively, the relative humidity can be raised by turning off the dehumidifier or decreasing the dehumidification by the dehumidifier when the dehumidifier is operating.

On the other hand, the relative humidity in the image forming apparatus 100 can be reduced by, for example, turning off the humidifier or decreasing the humidification by the humidifier when the humidifier is operating. Alternatively, the relative humidity can be reduced by activating the dehumidifier when the dehumidifier is stopped, or increasing the dehumidification by the dehumidifier when the dehumidifier is operating. When there is no change in the charge amount of the developer, the operation control of the humidifier and the dehumidifier is not changed.

(d) Change (Raise/Reduction) of Lubricant Application Brush θ of Photosensitive Drum 122

By changing lubricant application brush θ, the charge amount of the developer can be adjusted. The lubricant application brush θ is a ratio of rotational speed between the lubricant application brush and the developing roller 125. When the lubricant application brush θ is raised, the amount of lubricant taken into the developer increases, thereby the charge amount of the developer decreases. On the other hand, when the lubricant application brush θ is reduced, the amount of lubricant taken into the developer decreases, thereby the charge amount of the developer increases.

The charge amount adjuster decreases the charge amount by raising the lubricant application brush θ when the charge amount is increasing. Meanwhile, the charge amount adjuster increases the charge amount of the developer by reducing the lubricant application brush θ when the charge amount of the developer is decreasing. In addition, when there is no change in the charge amount of the developer, the lubricant application brush θ is not changed.

(Control Method of Image Forming Apparatus 100)

Figure 4:
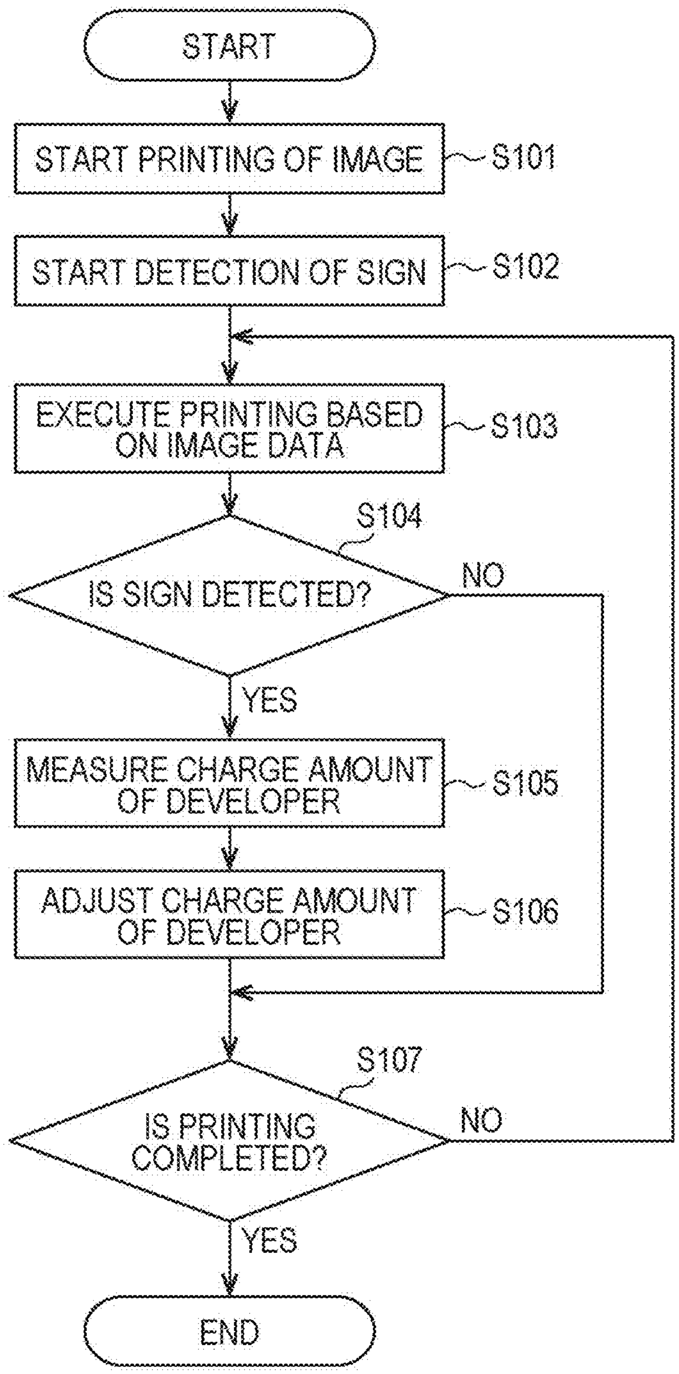
FIG. 4 is a flowchart illustrating an example of a processing procedure of a control method of the image forming apparatus according to an embodiment of the present invention.

FIG. 4 is a flowchart illustrating an example of a processing procedure of a control method of the image forming apparatus 100 according to an embodiment of the present invention. The processing in the flowchart illustrated in FIG. 4 is implemented by the CPU 191 executing the inspection program.

First, the controller 190 performs a control to start printing of an image (step S101). The controller 190 generates image data based on a print job and calculates the document coverage for each page based on the generated image data.

In addition, the controller 190 calculates, for each section, the average coverage, the variation width of the average coverage, and the standard deviation of the document coverage data per 10 pages of the image data, and stores them in the RAM 193. In addition, the controller 190 cooperates with the ammeter AM and the optical density sensor 170 to measure the charge amount of the developer contained in the developing device 121 and stores the measurement result Tcm in the RAM 193.

Next, the controller 190 starts detection of a sign (step S102). The controller 190 detects any of the above-described cases (1-1) to (1-4) as a sign that the charge amount of the developer changes. In addition, the controller 190 detects any of the above-described cases (2-1) and (2-2) as a sign that the charge amount returns to its original state.

Next, the controller 190 performs a control to execute printing based on the image data (step S103). More specifically, the image forming section 120 forms a toner image on the photosensitive drum 122 based on the image data, the transfer section 130 transfers the toner image on the photosensitive drum 122 onto the sheet 10, and the fixing section 150 fixes the toner image transferred onto the sheet 10. The sheet 10 on which the image has been printed is ejected from the sheet ejection section 146 to the outside of the image forming apparatus 100 through the sheet conveyance path 141.

Next, the controller 190 determines whether or not a sign is detected (step S104). In a case where a sign is not detected (step S104: NO), the controller 190 determines whether or not the printing is completed (step S107). In a case where the printing is completed (step S107: YES), the controller 190 ends the processing (end). On the other hand, in a case where the printing is not completed (step S107: NO), the controller 190 returns to the processing of step S103.

On the other hand, in a case where a sign is detected (step S104: YES), the controller 190 measures the charge amount of the developer (step S105). In a case where a sign is detected, the controller 190 performs a control to measure the charge amount of the developer contained in the developing device 121.

Next, the controller 190 adjusts the charge amount of the developer (step S106). The controller 190 adjusts the charge amount of the developer according to the measurement result of the charge amount. More specifically, for example, when the charge amount is increasing, the controller 190 raises the toner concentration Tc. As a result, the charge amount decreases. On the other hand, when the charge amount is decreasing, the controller 190 reduces the toner concentration Tc. As a result, the charge amount increases. Then, the controller 190 determines whether or not the printing is completed (Step S107).

As described above, in the processing in the flowchart illustrated in FIG. 4, a sign that the charge amount of the developer contained in the developing device 121 changes and a sign that the charge amount returns to its original state are detected, and in accordance with the sign detection result, the charge amount of the developer is measured. Then, according to the measurement result, the charge amount of the developer is adjusted.

Example 1

(Specific Example of Charge Amount Adjustment)

Figure 5:
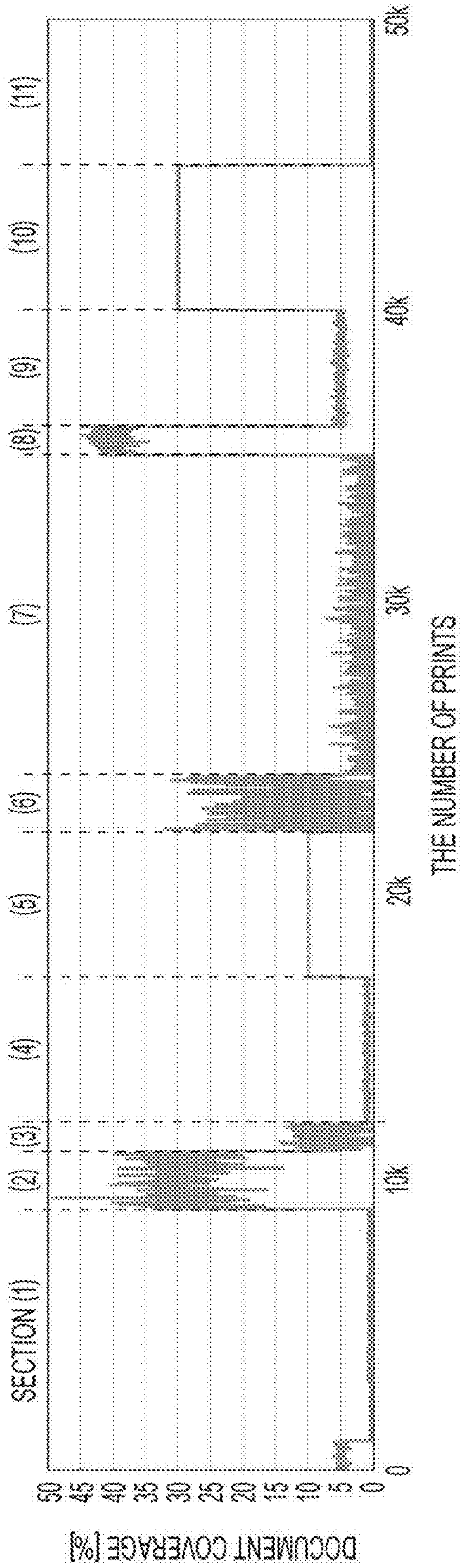
FIG. 5 is a graph illustrating an example of a change in a document coverage with respect to the number of prints in a printing test 1 of Example 1.
Figure 6A:
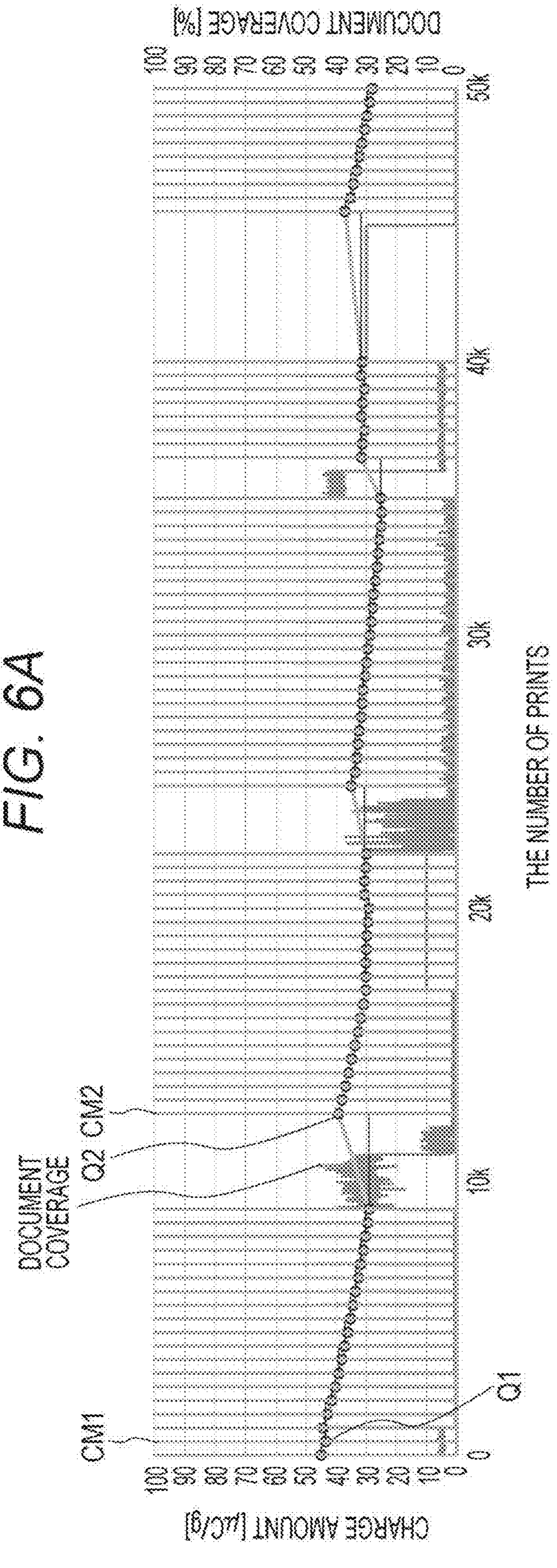
FIG. 6A is a graph illustrating an example of a change in the charge amount with respect to the number of prints in the printing test 1 of Example 1.
Figure 6B:
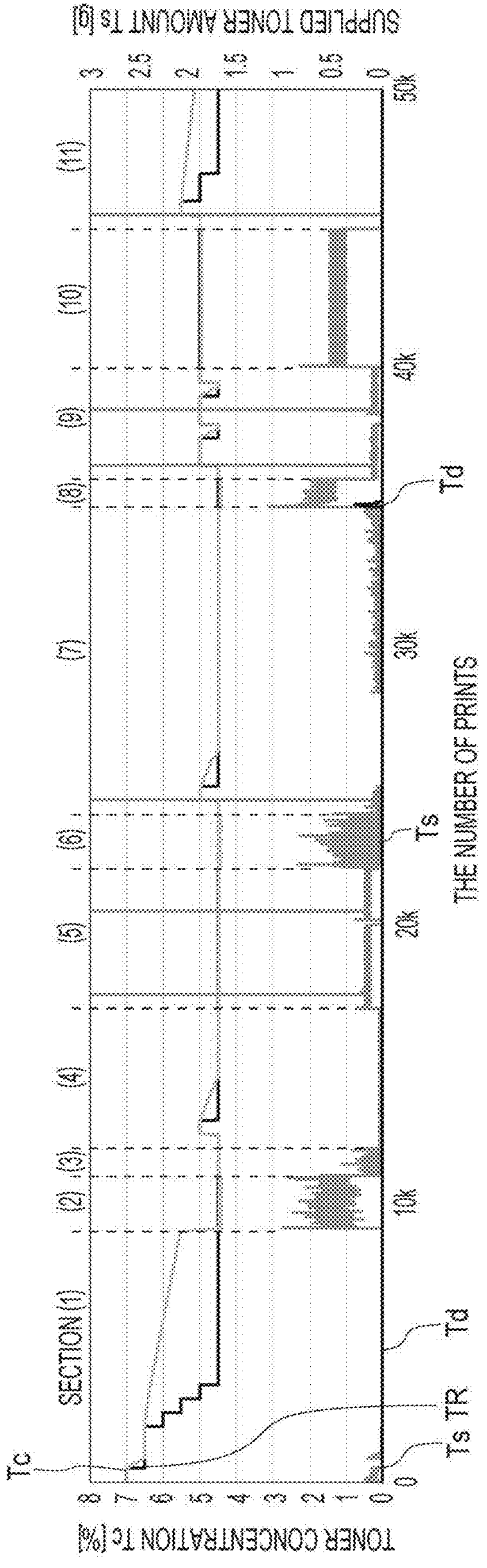
FIG. 6B is a graph illustrating an example of changes in a toner concentration Tc, a supplied toner amount Ts, and a toner dispersion amount Td with respect to the number of prints in the printing test 1 of Example 1.

FIG. 5 is a graph illustrating an example of a change in the document coverage with respect to the number of prints in a printing test 1 of Example 1. In addition, FIG. 6A is a graph illustrating a change in the charge amount with respect to the number of prints in the printing test 1 of Example 1. FIG. 6B is a graph illustrating changes in the toner concentration Tc, a supplied toner amount Ts, and a toner dispersion amount Td with respect to the number of prints in the printing test 1 of Example 1.

[Document Coverage]

As illustrated in FIG. 5, the controller 190 acquired image data of a document and calculated the document coverage based on the image data. The number of prints was 50,000 (50k) sheets in total in terms of A4 size sheet. In addition, the controller 190 set sections (1) to (11) for the document coverage data, and calculated the average value of the document coverage (hereinafter may be abbreviated as "cover") for every 10 pages for each section. For example, the "average 5% cover" means an average 5% document coverage. In addition, in each section, the variation width means a width (maximum value-minimum value) of variation of the average coverage. In addition, the "fixed 10% cover" means that the document coverage is fixed at 10% (i.e., 0% variation width). In addition, the "high cover" means that the average coverage is relatively high, and the "low cover" means the average coverage is relatively low. For example, in the present specification, a case where the average coverage is equal to or greater than 20% is referred to as the "high cover", and a case where the average coverage is equal to or less than 1% is referred to as the "low cover".

In this example, the printing test 1 described below was performed using the image forming apparatus 100 that is dry electrophotographic type (dry two-component developing type) capable of printing images of 100 pages (100 ppm) per minute in terms of A4 size sheet.

[Printing Test 1]

Section (1): 1,000 prints with the average 5% cover (the 0.5% variation width) and the 0.1% standard deviation, and then 8,000 prints with the low cover of the average 0.5% cover (the 0.3% standard deviation) and the 0.1% standard deviation.

Section (2): 2,000 prints with the high cover of the average 30% cover (the 8% variation width) and the 1.5% standard deviation.

Section (3): 1,000 prints with the average 5% cover (the 4% variation width) and the 1.2% standard deviation.

Section (4): 8,000 prints with the low cover of the average 1% cover (the 0.3% variation width) and the 0.1% standard deviation.

Section (5): 5,000 prints with the fixed 10% cover.

Section (6): 2,000 prints with the average 10% cover (the 8% variation width) and the 2.1% standard deviation.

Section (7): 11,000 prints with the low cover of the average 1% cover (the 1.7% variation width) and the 0.4% standard deviation.

Section (8): 1,000 prints with the high cover of the average 40% cover (the 2.5% variation width) and the 0.8% standard deviation.

Section (9): 4,000 prints with the average 5% cover (within the 0.9% variation width) and the 0.2% standard deviation.

Section (10): 5,000 prints with the fixed 30% cover.

Section (11): 5,000 prints with the fixed 0.3% cover.

[Monitoring of Supplied Toner Amount Ts, Toner Dispersion Amount Td, and Toner Concentration Tc]

In order to monitor the supplied toner amount Ts during printing, the image forming apparatus 100 is configured to measure the weight of the toner cartridge for toner supply. In addition, in order to monitor the toner dispersion amount Td during printing, the image forming apparatus 100 is provided with a dispersed toner collection box including a cyclone structure that sucks all the toner dispersed from the developing device 121 and is configured to measure the weight of the box. In addition, the image forming apparatus 100 is configured to monitor the toner concentration Tc using the toner concentration sensor 126 that measures the permeability in the developer.

[Charge Amount Adjustment Method]

By setting the toner concentration Tc immediately after the maintenance of the image forming apparatus 100 by the service technician as a reference value, and changing (raising/reducing) the toner concentration Tc according to the change in the charge amount from the previous measurement in accordance with Table 2 below, the charge amount was adjusted. Hereinafter, the maintenance of the image forming apparatus 100 by the service technician is simply referred to as "maintenance". Note that the range of change of the toner concentration Tc was set to a reference value±2.5%.

TABLE 2

| | Amount of Change in Charge Amount from Previous Measurement | | | | | | |
|---|---|---|---|---|---|---|---|
| | Minimum Value | — | −1 μC/g | — | —+1 μC/g | — | Maximum Value |
| Amount of Change of Tc | Reference Value −2.5% | −0.5% | | ±0% | | +0.5% | Reference Value +2.5% |

[Charge Amount Measurement Execution Condition]

In this example, the controller 190 detected the case where the state in which the variation width of the average coverage is equal to or less than 3% (the second threshold value) continued for 500 prints as a sign that the charge amount changes. When the sign was detected, the controller 190 measured the charge amount for every 500 prints from the start of printing, and adjusted the charge amount according to the measurement result. Note that when the average coverage was equal to or greater than 20% (the first threshold value), the measurement and adjustment of the charge amount were not performed even in a case where there was no variation in the average coverage.

In the section (1), 1,000 prints were made with the average 5% cover, and then 8,000 prints were made with the average 0.5% cover. Since the state in which the variation width of the average coverage was 0.3% continued for 500 prints, the charge amount measurement execution condition was satisfied. Thus, as illustrated in FIG. 6A, the controller 190 performed the charge amount measurement (for example, a reference sign CM1 in FIG. 6A) for every 500 prints. As a result, the controller 190 detected a decrease in the charge amount (for example, a reference sign Q1 in FIG. 6A). As illustrated in FIG. 6B, the controller 190 performed a change (a reference sign TR in FIG. 6B) to reduce the toner concentration Tc according to the decrease in the charge amount with respect to the number of prints.

Meanwhile, in the section (2), the average cover was 30%, and the printing of pages with the high average coverage continued. As illustrated in FIG. 6B, in the section (2), although the average coverage became high, the toner did not disperse (i.e., the toner dispersion amount Td did not change). This is because the controller 190 performed a change to reduce the toner concentration Tc in the section (1). In addition, in the section (2), since the average coverage was equal to or greater than 20%, the charge amount measurement execution condition was not satisfied, and thus the charge amount measurement was not performed.

In the section (3), the printing with the average 5% cover (the 4% variation width) was performed. Thus, since the charge amount measurement execution condition was not satisfied, the charge amount measurement was not performed, and thus the toner concentration Tc in the section (2) was maintained. In addition, the toner did not disperse (that is, the toner dispersion amount Td was maintained).

In the section (4), the average cover was 1%, and the printing of pages with the low average coverage continued again, so that it is considered that deterioration of the developer progressed. Since the state in which the variation width of the average coverage was 0.3% continued for 500 prints, the charge amount measurement execution condition was satisfied, and thus the controller 190 performed the charge amount measurement (a reference sign CM2 in FIG. 6A). As a result, the controller 190 detected an increase in the charge amount (a reference sign Q2 in FIG. 6A) due to stirring of the toner supplied in the section (2) and the carrier, and thus temporarily raised the toner concentration Tc. Then, since the printing of pages with the low average coverage also continued in the next 500 prints, the controller 190 measured the charge amount, and detected a decrease in the charge amount, so that the controller 190 performed a control to reduce the toner concentration Tc again. In this manner, a decrease in the charge amount was suppressed, and thus the toner dispersion amount Td did not increase.

In the section (5), the printing with the fixed 10% cover (i.e., the 0% variation width) was performed. Since there was no variation in the average coverage and the charge amount measurement execution condition was satisfied, the controller 190 measured the charge amount for every 500 prints. As a result, the controller 190 detected that the charge amount kept decreasing subsequent to the section (4). Since the controller 190 continued performing the change to reduce the toner concentration Tc, the toner did not disperse.

In the section (6), the printing with the average 10% cover (the 8% variation width) was performed. Subsequent to the section (5), the toner did not disperse. In addition, since the variation width was 8% and the charge amount measurement execution condition was not satisfied, the charge amount measurement was not performed.

In the section (7), 11,000 prints were made with the average 1% cover, and the printing of pages with the low average coverage continued, so that it is considered that deterioration of the developer progressed. Since the state in which the variation width of the average coverage was 1.7% continued for 500 prints, the charge amount measurement execution condition was satisfied. Thus, the controller 190 performed the charge amount measurement for every 500 prints, then detected a decrease in the charge amount, so that the controller 190 performed a change to reduce the toner concentration Tc according to the decrease in the charge amount. The decrease in the charge amount was suppressed, and thus the toner dispersion amount Td did not increase.

In the section (8), 1,000 prints were made with the average 40% cover, and the printing of pages with the high average coverage continued. The temporary increase in the toner dispersion amount Td is considered to be due to the occurrence of poor mixing caused by a difference between the charge amount of the developer in the developing device 121 and the charge amount of the supplied toner. However, since the change to reduce the toner concentration Tc was performed in the section (7), the toner dispersion amount Td was significantly suppressed. In addition, in the section (8), since the average coverage was equal to or greater than 20%, the charge amount measurement execution condition was not satisfied, and thus the charge amount measurement was not performed.

In the section (9), 4,000 prints were made with the average 5% cover (within the 0.9% variation width). Since the state in which the variation width of the average coverage was 0.9% continued for 500 prints, the charge amount measurement execution condition was satisfied, and thus the controller 190 performed the charge amount measurement. As a result, the controller 190 detected an increase in the charge amount due to stirring of the carrier in the developing device 121 and the toner supplied in the section (8), and thus temporarily raised the toner concentration Tc. Then, since the printing of pages with the low average coverage also continued in the next 500 prints, the controller 190 measured the charge amount, and detected a decrease in the charge amount, so that the controller 190 performed a change to reduce the toner concentration Tc again. Thereafter, in the next charge amount measurement, the controller 190 detected the charge amount increased due to the reduction of the toner concentration Tc, and then performed a change to raise the toner concentration Tc according to the increase in the charge amount. In still the next charge amount measurement, the controller 190 detected the charge amount decreased due to the raise of the toner concentration Tc, and then performed a change to reduce the toner concentration Tc again according to the decrease in the charge amount. As described above, although the raise and reduction of the toner concentration Tc were repeated, the decrease in the charge amount was suppressed by controlling the toner concentration Tc, thereby the toner dispersion amount Td did not increase.

In the section (10), 5,000 prints were made with the fixed 40% cover, and the printing of pages with the high average coverage continued. Since the controller 190 performed a change to reduce the toner concentration Tc in the section (9), the toner dispersion amount Td did not increase. In addition, in the section (10), since the average coverage was equal to or greater than 20%, the charge amount measurement execution condition was not satisfied, and thus the charge amount measurement was not performed.

In the section (11), 5,000 prints were made with the fixed 0.3% cover (i.e., the 0% variation width), and the printing of pages with the low average coverage continued, so that it is considered that deterioration of the developer progressed. Since the state in which there was no variation in the average coverage continued for 500 prints, the charge amount measurement execution condition was satisfied, and thus the controller 190 performed the charge amount measurement. As a result, the controller 190 detected an increase in the charge amount due to stifling of the carrier in the developing device 121 and the toner supplied in the section (10), and thus temporarily raised the toner concentration Tc. Then, since the printing of pages with the low average coverage also continued in the next 500 prints, the controller 190 measured the charge amount, and detected a decrease in the charge amount, so that the controller 190 performed a change to reduce the toner concentration Tc again. In this manner, a decrease in the charge amount was suppressed, and thus the toner dispersion amount Td did not increase.

Figure 6C:
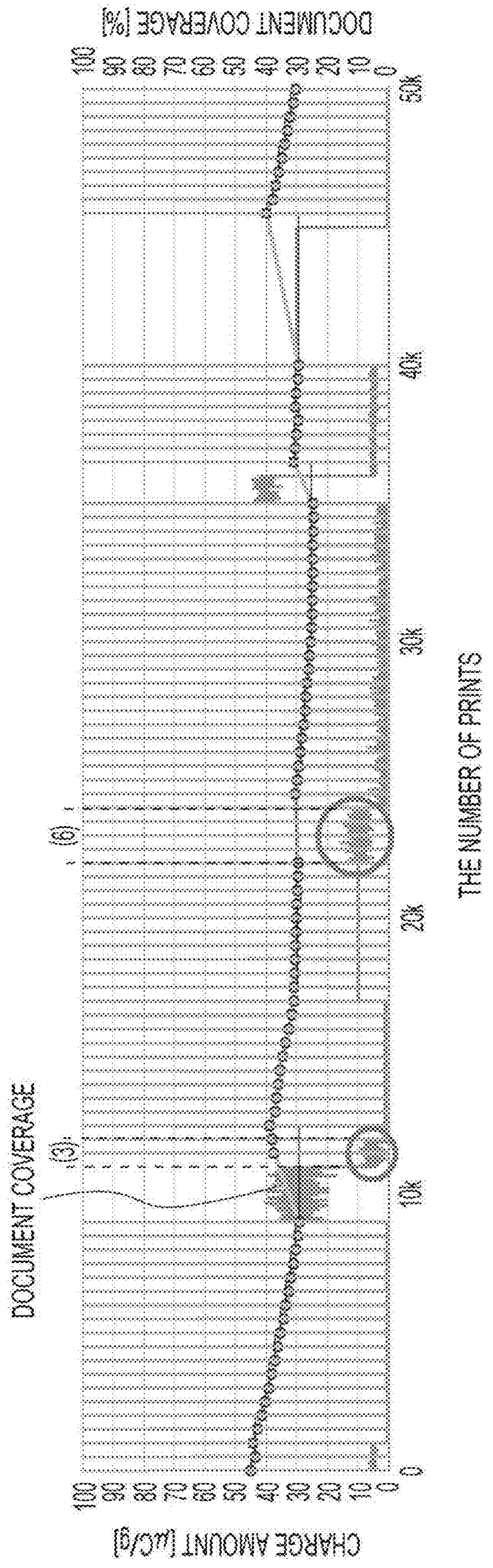
FIG. 6C is a graph illustrating an example of a change in the charge amount with respect to the number of prints in a printing test 2 of Example 1.

FIG. 6C is a graph illustrating an example of a change in the charge amount with respect to the number of prints in a printing test 2 of Example 1.

[Printing Test 2]

The sections (1), (2), (4), (5), and (7) to (11) are similar to those in the [Printing Test 1]. In the printing test 2, with respect to the printing test 1, the section (3) and the section (6) were changed as follows (ranges surrounded by a circle in FIG. 6C).

Section (3): 1,000 prints with the average 5% cover (the 1.4% variation width) and the 0.5% standard deviation.

Section (6): 2,000 prints with the average 10% cover (the 1.9% variation width) and the 0.6% standard deviation.

In the section (1), similarly to the printing test 1, the measurement and adjustment of the charge amount was performed.

In the section (2), similarly to the printing test 1, the measurement and adjustment of the charge amount were not performed.

In the section (3), the average coverage was 5%, and unlike the printing test 1, the charge amount measurement execution condition was satisfied. Thus, the measurement and adjustment of the charge amount were performed.

In the section (4) and the section (5), similarly to the printing test 1, the charge amount measurement execution condition was satisfied. Thus, the measurement and adjustment of the charge amount were performed.

In the section (6), the average coverage was 10%, and unlike the printing test 1, the charge amount measurement execution condition was satisfied. Thus, the measurement and adjustment of the charge amount were performed.

In the section (7), similarly to the printing test 1, the measurement and adjustment of the charge amount were performed.

In the section (8), similarly to the printing test 1, the measurement and adjustment of the charge amount were not performed.

In the section (9), similarly to the printing test 1, the measurement and adjustment of the charge amount were performed.

In the section (10), similarly to the printing test 1, the measurement and adjustment of the charge amount were not performed.

In the section (11), similarly to the printing test 1, the measurement and adjustment of the charge amount were performed.

As described above, in this example, the controller 190 performed the charge amount measurement for every predetermined number of prints (for example, 500 prints) when the charge amount measurement execution condition was satisfied. Meanwhile, the controller 190 did not performed the charge amount measurement when the charge amount measurement was not satisfied.

Comparative Example 1

In Comparative Example 1, test printing of 50,000 prints in total was performed by the image forming apparatus configured to perform the charge amount measurement for every 500 prints and adjust the charge amount according to the measurement result. The same image data as used in the example 1 was used. The charge amount measurement was performed even when the charge amount was sufficiently large to the extent that toner dispersion did not occur, and the productivity of normal printing decreased compared with the example 1, accordingly.

Comparative Example 2

Figure 7A:
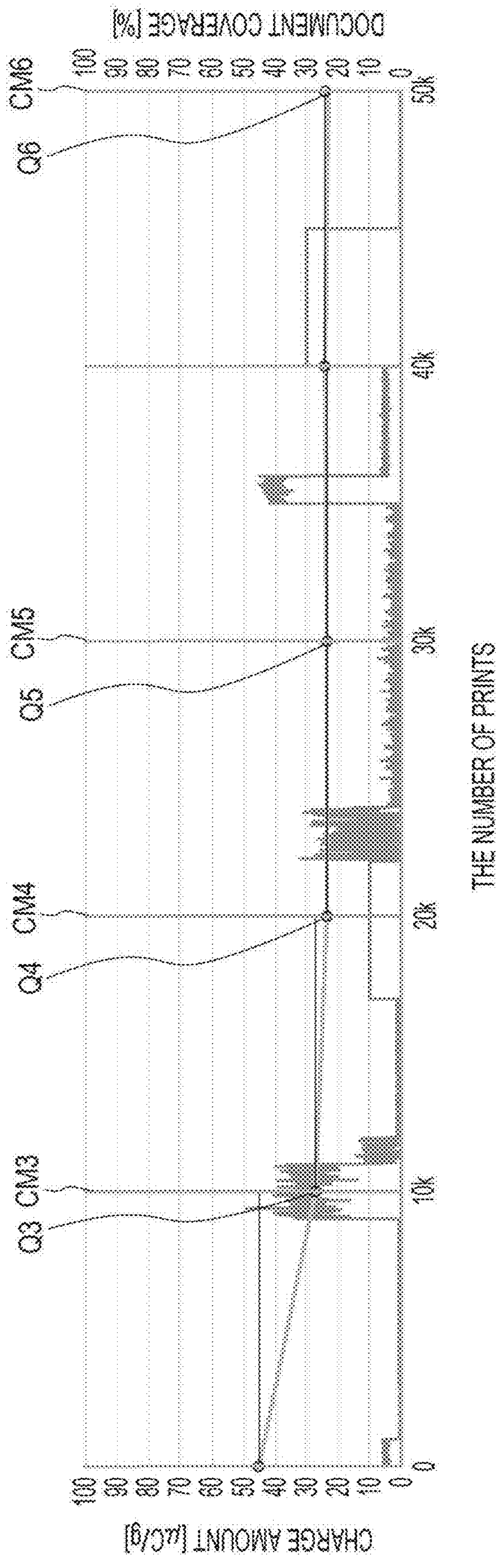
FIG. 7A is a graph illustrating an example of a change in the charge amount with respect to the number of prints in a printing test 1 of Comparative Example 2.
Figure 7B:
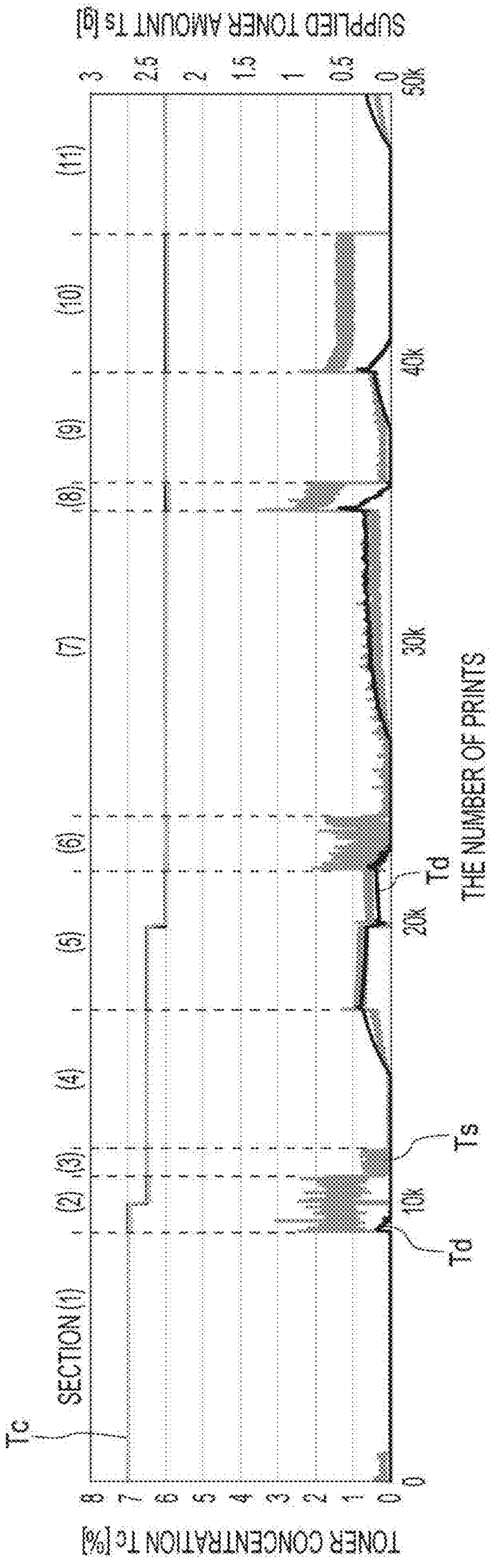
FIG. 7B is a graph illustrating an example of changes in the toner concentration Tc, the supplied toner amount Ts, and the toner dispersion amount Td with respect to the number of prints in the printing test 1 of Comparative Example 2.

Meanwhile, when the interval of the charge amount measurement is widened to improve the productivity, it was not possible to cope with the change in the charge amount and to accurately measure the charge amount. FIG. 7A is a graph illustrating an example of a change in the charge amount with respect to the number of prints in the printing test 1 of Comparative Example 2, and FIG. 7B is a graph illustrating an example of changes of the toner concentration Tc, the supplied toner amount Ts, and the toner dispersion amount Td with respect to the number of prints in the printing test 1 of Comparative Example 2. In this comparative example, the charge amount was measured for every 10,000 prints from the start of printing, and the adjustment was performed to make the charge amount change in a direction opposite to the direction in which the charge amount had changed. The same image data as used in the example 1 was used.

In the section (1), the printing in a state of the low average coverage and low toner supply continued. Accordingly, as the time of the toner staying in the developing device 121 was extended, the time during which the toner was subjected to stifling was prolonged. Thus, the mechanical stress applied to the developer increased, so that it is considered that deterioration of the developer progressed by the external additive of the toner being liberated. However, since the number of prints had not reached 10,000 prints, measurement and adjustment of the charge amount were not performed.

In the section (2), when the number of prints had reached 10,000 prints, the charge amount measurement (a reference sign CM3 in FIG. 7A) was performed, then a decrease in the charge amount (reference sign Q3 in FIG. 7A) was detected, and a change to reduce the toner concentration Tc was performed. After the toner supply, the toner dispersion amount Td temporarily increased. The temporary increase in the toner dispersion amount Td is considered to be due to the occurrence of poor mixing caused by a difference between the charge amount of the developer contained in the developing device 121 and the charge amount of the supplied toner.

In the section (3), the charge amount measurement was not performed, and thus the toner concentration Tc in the section (2) was maintained. In addition, the toner did not disperse.

In the section (4), the printing of pages with the low average coverage continued, so that it is considered that deterioration of the developer progressed. However, the measurement and adjustment of the charge amount were not performed. Thus, the toner dispersion amount Td was greatly increased in the middle of the section (4).

In the section (5), the printing with the fixed 10% cover (i.e., 0% variation width) was performed. With respect to such a document coverage having no variation in the average height, the toner is regularly and stably supplied to the developing device 121. In addition, the supplied toner is not yet subjected to mechanical stress and its surface containing the external additive is stable, which exhibits good performance. Thus, a phenomenon in which the supplied toner having better performance than the toner originally contained in the developer in the developing device 121 is preferentially consumed during development occurred in the middle of the section (5). The toner originally contained in the developer is not consumed for development and continues to be subjected to mechanical stress, resulting in a decrease in performance of the toner. Accordingly, the toner becomes deteriorated toner having the decreased charge amount. In the present specification, a phenomenon in which the supplied toner having better performance is preferentially consumed during development is referred to as a "supplied toner preference development". The deteriorated toner increased the toner dispersion amount Td continuously subsequent to the section (4). This causes frequent occurrence of the toner contamination. In contrast, in a case where the document coverage is high even if there is no variation in the document coverage, or in a case where there is a variation in the average coverage for each print even if the average coverage is constant with respect to the number of prints, the supplied toner preference development does not occur or is less likely to occur. Thus, the toner contamination does not occur or occurs only slightly.

When the number of prints had reached 20,000 prints, the charge amount measurement (a reference sign CM4 in FIG. 7A) was performed, then a decrease in the charge amount (a reference sign Q4 in FIG. 7A) was detected, and a change to reduce the toner concentration Tc was performed. However, the charge amount measurement was not performed until the middle of the section (5) and the charge amount was not adjusted until then, so that a large amount of toner continuously dispersed.

In the section (6), the variation of the average coverage was large, so that the deteriorated toner generated by the "supplied toner preference development" in the section (5) was used for development. That is, by printing the document image with the high document coverage, the deteriorated toner contained in the developer was also consumed and decreased by being used for development. It is considered that the charge amount increased and the toner dispersion amount Td decreased, accordingly.

In the section (7), the printing of pages with the low average coverage continued, so that it is considered that deterioration of the developer progressed. When the number of prints had reached 30,000 prints, the charge amount measurement (a reference sign CM5 in FIG. 7A) was performed to obtain the charge amount (a reference sign Q5 in FIG. 7A). However, the decrease in the charge amount due to the low cover in the section (7) and the increase in the charge amount due to stirring of the carrier in the developing device 121 and the toner supplied in the section (6) are influenced by each other, so that the decreasing tendency in the charge amount could not be detected. Since the decrease in the charge amount was not detected, a change to reduce the toner concentration Tc was not performed. As a result, the toner dispersion increased.

In the section (8), the printing of pages with the high average coverage (the average 40% cover) was performed. At the time of toner supply in the initial stage of the section, the toner dispersion amount Td temporarily increased. The temporary increase in the toner dispersion amount Td is considered to be due to the occurrence of poor mixing caused by a difference between the charge amount of the developer in the developing device 121 and the charge amount of the supplied toner.

In the section (9), the printing with the document coverage with a small variation width of the average 5% coverage (within the 0.9% variation width) was performed, so that it is considered that the supplied toner preference development occurred in the middle of the section (9), thereby the toner deteriorated and the charge amount decreased. Since the measurement and adjustment of the charge amount were not performed, the toner dispersion amount Td greatly increased in the middle of the section (9).

In the section (10), the printing of pages with the high average coverage (the fixed 30% cover) was performed. At the time of toner supply in the initial stage of the section, the toner dispersion amount Td temporarily increased. The temporary increase in the toner dispersion amount Td is considered to be due to the occurrence of poor mixing caused by a difference between the charge amount of the developer in the developing device 121 and the charge amount of the supplied toner. As the toner was consumed for development and the supplied toner was mixed thereto, the toner dispersion amount Td decreased. It is considered to be due to the increase in the charge amount.

In the section (11), the printing of pages with the low average coverage (the fixed 0.3% cover) continued, so that it is considered that deterioration of the developer progressed. However, the measurement and adjustment of the charge amount were not performed, thereby the toner dispersion amount Td greatly increased. When the number of prints had reached 50,000 prints, the charge amount measurement (a reference sign CM6 in FIG. 7A) was performed to obtain the charge amount (a reference sign Q6 in FIG. 7A). However, the decrease in the charge amount due to the low cover in the section (11) and the increase in the charge amount due to stirring of the carrier contained in the developer in the developing device 121 and the toner supplied in the section (10) are influenced by each other, so that the decreasing tendency in the charge amount could not be detected. Since the decrease in the charge amount was not detected, a change to reduce the toner concentration Tc was not performed. The total number of prints had reached 50,000, the printing was completed. However, in a case where the printing is continued thereafter, a further increase in toner dispersion amount Td is expected.

Example 2

In Example 1, a case where the above-described (1-1) is used as the charge amount measurement execution condition has been described. In Example 2, a case where the above-described (1-3) is used as the charge amount measurement execution condition will be described.

Figure 8A:
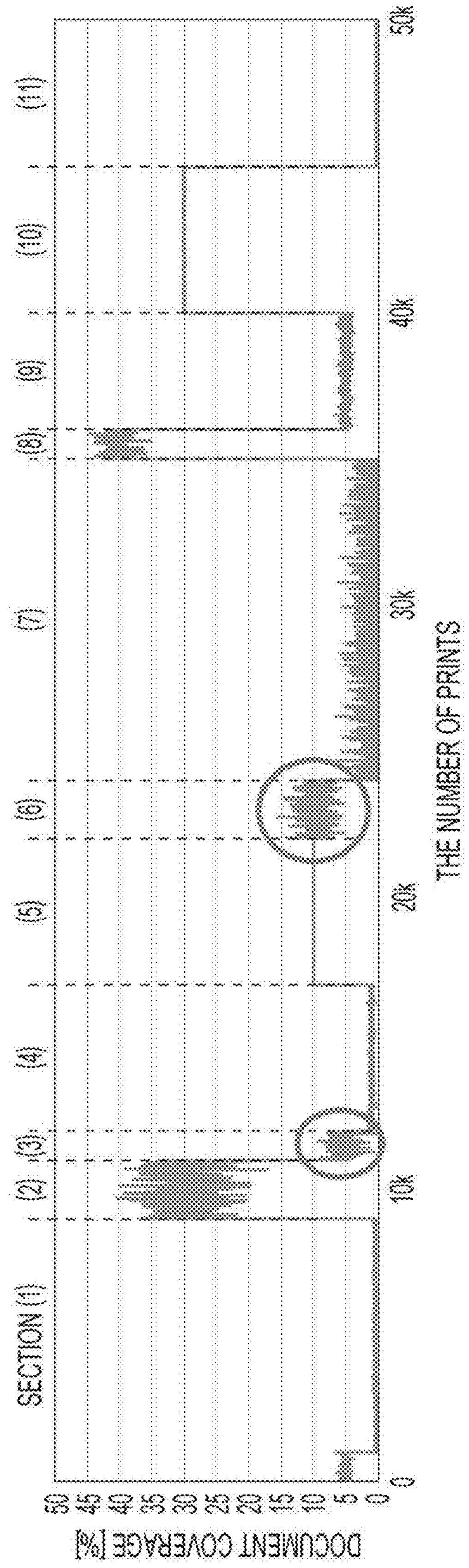
FIG. 8A is a graph illustrating an example of a change in the document coverage with respect to the number of prints in a printing test 2 of Example 2.
Figure 8B:
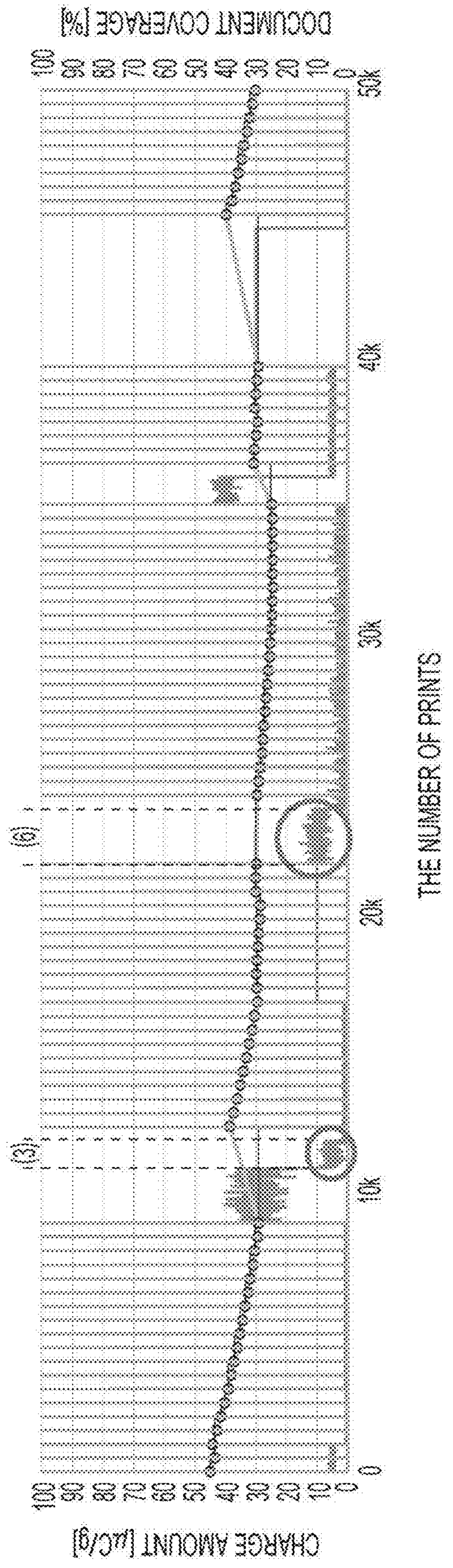
FIG. 8B is a graph illustrating an example of a change in the charge amount with respect to the number of prints in the printing test 2 of Example 2.

FIG. 8A is a graph illustrating an example of a change in the document coverage with respect to the number of prints in a printing test 2 of Example 2. In addition, FIG. 8B is a graph illustrating an example of a change in the charge amount with respect to the number of prints in the printing test 2 of Example 2. As illustrated in FIG. 8A, the controller 190 acquired image data of a document and calculated the document coverage based on the image data. Similarly to Example 1, the number of prints was 50,000 sheets in total in terms of A4 size sheet.

In this example, the controller 190 detected the case where the state in which the variation width of the average coverage is equal to or less than 3% (the second threshold value) and the standard deviation of the document coverage data is equal to or less than 0.4% (the third threshold value) continued for 500 prints as a sign that the charge amount changes. When the sign was detected, the controller 190 measured the charge amount for every 500 prints from the start of printing, and adjusted the charge amount according to the measurement result. Note that when the average coverage was equal to or greater than 20% (the first threshold value), the measurement and adjustment of the charge amount were not performed even in a case where there was no variation in the average coverage.

In the section (1), similarly to the printing test 2 of Example 1, the measurement and adjustment of the charge amount were performed.

In the section (2), similarly to the printing test 2 of Example 1, the measurement and adjustment of the charge amount were not performed.

In the section (3), the standard deviation was 0.5%, and unlike the printing test 2 of Example 1, the execution condition of the charge amount measurement was not satisfied. Thus, the measurement and adjustment of the charge amount were not performed.

In the section (4) and the section (5), similarly to Example 1, the charge amount measurement execution condition was satisfied. Thus, the measurement and adjustment of the charge amount were performed.

In the section (6), the standard deviation was 0.6%, and unlike the printing test 2 of Example 1, the execution condition of the charge amount measurement was not satisfied. Thus, the measurement and adjustment of the charge amount were not performed.

In the section (7), similarly to the printing test 2 of Example 1, the measurement and adjustment of the charge amount were performed.

In the section (8), similarly to the printing test 2 of Example 1, the measurement and adjustment of the charge amount were not performed.

In the section (9), similarly to the printing test 2 of Example 1, the measurement and adjustment of the charge amount were performed.

In the section (10), similarly to the printing test 2 of Example 1, the measurement and adjustment of the charge amount were not performed.

In the section (11), similarly to the printing test 2 of Example 1, the measurement and adjustment of the charge amount were performed.

In a case where the above-described (1-1) is used as the charge amount measurement execution condition similarly to the printing test 2 of Example 1, the charge amount measurement execution condition was satisfied in the section (3), so that the charge amount measurement, which takes about 30 seconds to be performed for every 500 prints, was performed twice out of 1,000 prints. Thus, the productivity is (the theoretical value required for 1,000 prints: 10 minutes)÷(the time actually required for 1,000 prints: 11 minutes)=91%. Similarly, the charge amount measurement execution condition was satisfied in the section (6), and the charge amount measurement, which takes about 30 seconds to be performed for every 500 prints, was performed four times out of 2,000 prints. Thus, the productivity is (the theoretical value required for 2,000 prints: 20 minutes)÷(the time actually required for 2,000 prints: 22 minutes)=91%. In contrast, in Example 2, the charge amount measurement was not performed in the section (3) and the section (6), so that the productivity thereof was 100%. The unnecessary charge amount measurement was not performed, and the productivity of normal printing by the image forming apparatus 100 was improved, accordingly.

Example 3

In Example 3, as the charge amount measurement execution condition, in addition to the above-described (1-1), the above-described (2-1) or the case where the state in which the average coverage is equal to or greater than the predetermined 20% (the first threshold value) continues for 500 pages (the predetermined number of pages) will be described.

Figure 9A:
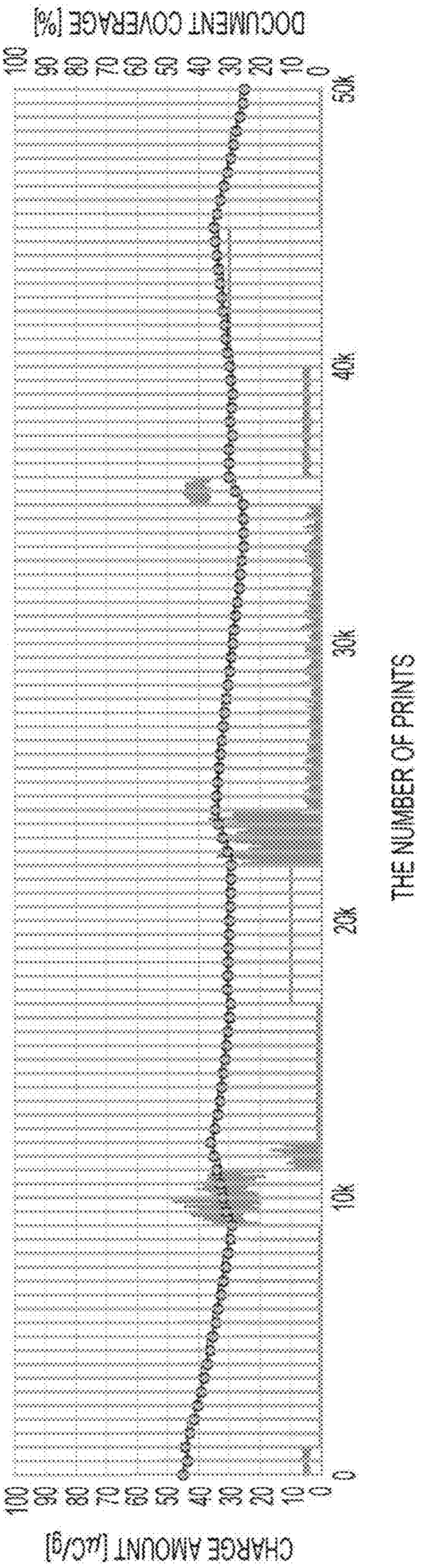
FIG. 9A is a graph illustrating an example of a change in the charge amount with respect to the number of prints in a printing test 1 of Example 3.
Figure 9B:
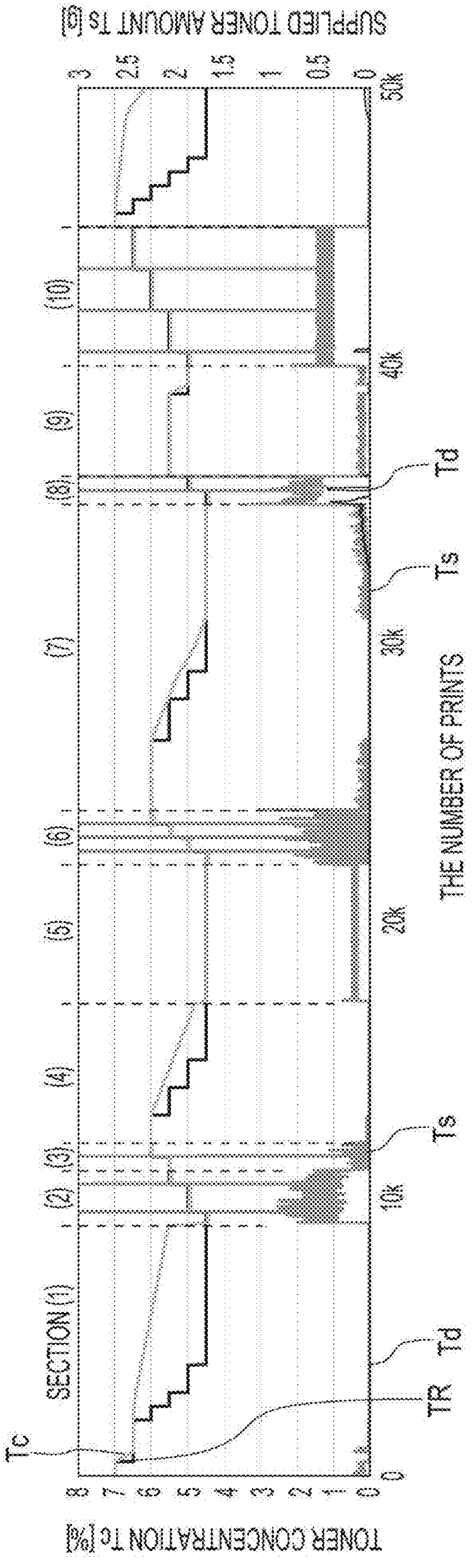
FIG. 9B is a graph illustrating an example of changes in the toner concentration Tc, the supplied toner amount Ts, and the toner dispersion amount Td with respect to the number of prints in the printing test 1 of Example 3.

FIG. 9A is a graph illustrating an example of a change in the charge amount with respect to the number of prints in a printing test 1 of Example 3. In addition, FIG. 9B is a graph illustrating an example of changes in the toner concentration Tc, the supplied toner amount Ts, and the toner dispersion amount Td with respect to the number of prints in the printing test 1 of Example 3.

In the sections (1), (4), (5), (7), (9), and (11), the charge amount was measured, similar to the printing test 1 of Example 1, under the charge amount measurement execution condition of the above-described (1-1).

On the other hand, in the sections (2), (3), (6), (8), and (10), the charge amount was measured for every 500 prints from the start of printing under the charge amount measurement execution condition of the above-described (2-1). The controller 190 had reduced the toner concentration Tc while detecting a decrease in the charge amount. Thereafter, the sign that the charge amount returns to its original state was detected, so that the controller 190 performed the charge amount measurement and raised the toner concentration Tc in response to the detection of an increase in the charge amount. In this example, as compared with the printing test 1 of Example 1, the toner concentration Tc frequently shifts to the high level, so that there was a case where the toner dispersion amount Td temporarily increased. However, the toner dispersion amount Td was largely suppressed as compared with the above-described printing test 1 of Comparative Example 2.

Note that in the above-described example, the case where the sign that the charge amount returns to its original state was detected in all of the sections of (2), (3), (6), (8), and (10) is exemplified. However, the present invention is not limited to such a case. For example, in terms of suppressing a decrease in productivity, the controller 190 may be configured to detect the sign that the charge amount returns to its original state only in a case where the high coverage, which is greater than the first threshold value, is detected (the section (2), the section (8), and the section (10)).

Note that, for example, with the apparatus configuration in which the amount of the developer is set to be small, the amount of the toner that can be used for development at a certain moment is small when the toner concentration Tc is low. Thus, in a case where there is a variation in which the document coverage greatly increases in a short period of time, a malfunction may occur in that the portion with the high image concentration becomes lighter and the like. Thus, in Example 3, when it is detected that the charge amount is increasing, the toner concentration Tc, which has been reduced to suppress a decrease in the charge amount, is raised to return to its original state. In this manner, a risk of occurrence of the above-described malfunction can be reduced.

<Other Charge Amount Adjustment Mean>

In Examples 1 to 3, the case where the charge amount is adjusted by changing (raising/reducing) the toner concentration Tc has been described. As described above, other than changing the toner concentration Tc, it is also possible to adjust the charge amount by changing the toner amount for development or the relative humidity in the image forming apparatus 100.

The change of the toner amount for development includes a change of the development θ and a change of the developing AC bias.

Change of the Development θ

TABLE 3

| | Amount of Change in Charge Amount from Previous Measurement | | | | | | |
|---|---|---|---|---|---|---|---|
| | Minimum Value | — | −1 μC/g | — | —+1 μC/g | — | Maximum Value |
| Amount of Change of Development θ | Reference Value −0.7 | −0.1 | | ±0 | | +0.1 | Reference Value +0.7 |
| (Reference) Development θ | 1.1 | 1.7 | | 1.8 | | 1.9 | 2.5 |

By setting the development θ immediately after the maintenance (for or example, 1.8) as a reference value, and changing (raising/reducing) the development θ according to the amount of change in the charge amount from the previous measurement in accordance with Table 3 above, the charge amount is adjusted.

Change of the Developing AC Bias

TABLE 4

| | Amount of Change in Charge Amount from Previous Measurement | | | | | | |
|---|---|---|---|---|---|---|---|
| | Minimum Value | — | −1 μC/g | — | —+1 μC/g | — | Maximum Value |
| Amount of Change of Developing AC Bias | Reference Value −0.8 kV | −0.2 kV | | ±0 kV | | +0.2 kV | Reference Value +0.8 kV |
| (Reference) Developing AC Bias | 0.2 kV | 0.8 kV | | 1 kV | | 1.2 kV | 1.8 kV |

By setting the developing AC bias immediately after the maintenance (for or example, 1 kV) as a reference value, and changing (raising/reducing) the developing AC bias according to the amount of change in the charge amount from the previous measurement in accordance with Table 4 above, the charge amount is adjusted.

Change of the Relative Humidity in the Image Forming Apparatus 100

TABLE 5

| | Amount of Change in Charge Amount from Previous Measurement | | | | | | |
|---|---|---|---|---|---|---|---|
| | Minimum Value | — | −1 μC/g | — | —+1 μC/g | — | Maximum Value |
| Amount of Change of Relative Humidity | Reference Value −25% | −5% | | ±0% | | +5% | Reference Value +25% |

By setting the value of the relative humidity immediately after the maintenance as a reference value, and changing (raising/reducing) the relative humidity according to the amount of change in the charge amount from the previous measurement when the variation in the relative humidity in the vicinity of the developing device 121 is detected to be equal to or greater than 5% in accordance with Table 5 above, the charge amount is adjusted.

The image forming apparatus 100 according to the present embodiment described above has the following effects.

The controller 190 detects a sign that the charge amount of the developer contained in the developing device 121 changes, so that it is possible to measure the charge amount at the timing when a change in the charge amount is expected. In this manner, the controller 190 can appropriately take a measure to suppress a change in the charge amount, thereby the toner dispersion can be suppressed. In addition, the charge amount is measured only at the timing when a change in the charge amount is expected, so that it is possible to avoid an unnecessary operation stop in normal printing by the image forming apparatus 100. Accordingly, a decrease in productivity of normal printing by the image forming apparatus 100 can be suppressed. As described above, according to the image forming apparatus 100, it is possible to suppress a decrease in productivity of normal printing while suppressing the toner dispersion.

In addition, the charge amount adjuster performs an adjustment to make the charge amount decrease when an increase in the charge amount of the developer is detected, and performs an adjustment to make the charge amount increase when a decrease in the charge amount is detected. Thus, the charge amount is prevented or suppressed from becoming too small or too large.

In addition, using the document coverage based on image data of a document, a sign that the charge amount of the developer changes is detected. Thus, it is possible to reflect the amount of toner required for printing of a document image in the sign detection. Accordingly, it is possible to detect a sign that the charge amount of the developer changes accurately.

In addition, using at least one of the average value and the standard deviation of the document coverage, a sign that the charge amount of the developer changes is detected. Thus, it is possible to detect a sign in consideration of the abundance or scarcity and variation of the amount of toner required for printing of a document image.

In addition, since a sign that the charge amount of the developer changes is detected using the relative humidity in the image forming apparatus 100, it is possible to detect the sign in consideration of the relative humidity.

In addition, after the charge amount of the developer is adjusted, the charge amount of the developer is measured and the adjustment is changed according to the measurement result. This can suppress the charge amount of the developer from being excessively adjusted.

In addition, after the charge amount of the developer is adjusted, a sign that the charge amount of the developer returns to its original state is detected. This can suppress the charge amount of the developer from being excessively adjusted.

The charge amount of the developer is adjusted according to the amount of change in the charge amount that has been measured. This enables accurate adjustment of the charge amount.

The present invention is not limited to the above-described embodiment, and various modifications can be made within the scope of the claims.

In addition, in the above-described embodiment, the case where the charge amount of the developer is measured by the Q/M measurement has been described. However, the present invention is not limited to such a case, and the controller 190 may be configured to measure the charge amount of the developer by using other measurement means.

In addition, some of the steps in the flowchart described above may be omitted, and other steps may be added. In addition, some of the steps may be executed at the same time, and one step may be divided into a plurality of steps to be executed.

In addition, the control program may be provided with, for example, a computer-readable recording medium such as a USB memory, a flexible disc or a CD-ROM. The program may be provided online via a network such as the Internet. In this case, the program recorded on the computer-readable recording medium is usually transferred to and stored in a memory, a storage, or the like. Alternatively, the control program may be provided, for example, as a single piece of application software or may be incorporated, as a function of a server, into software of apparatuses.

In addition, a part or a whole of the processing executed by the program in the embodiment may be replaced with hardware such as a circuit to be executed.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image forming apparatus comprising:

an image bearing member on which an electrostatic latent image is formed based on image data;

a developing section that contains a developer and develops the electrostatic latent image formed on the image bearing member with the developer to form a toner image; and a hardware processor that detects a sign that a charge amount of the developer contained in the developing section changes, measures the charge amount of the developer in accordance with a detection result; and adjusts a charge amount change of the developer according to a measurement result.

2. The image forming apparatus according to claim 1, wherein the hardware processor performs an adjustment to make the charge amount decrease when an increase in the charge amount of the developer is detected, and performs an adjustment to make the charge amount increase when a decrease in the charge amount is detected.

3. The image forming apparatus according to claim 1, wherein the hardware processor acquires image data, and the hardware processor detects the sign using a document coverage based on the image data.

4. The image forming apparatus according to claim 3, wherein the hardware processor sets a page section for the image data including a plurality of pages and calculates at least one of an average value and a standard deviation of the document coverage for a set page section, and the hardware processor detects the sign using a calculation result.

5. The image forming apparatus according to claim 1, further comprising:

a relative humidity measurement section that measures relative humidity in the image forming apparatus, wherein the hardware processor detects the sign using a measurement result by the relative humidity measurement section.

6. The image forming apparatus according to claim 1, wherein the hardware processor measures the charge amount of the developer after adjusting a charge amount change of the developer, and the hardware processor changes an adjustment according to a measurement result.

7. The image forming apparatus according to claim 6, wherein the hardware processor detects a sign that the charge amount of the developer returns to its original state after adjusting a charge amount change of the developer, and the hardware processor measures the charge amount of the developer in accordance with a detection result.

8. The image forming apparatus according to claim 1 wherein the hardware processor determines that the sign is detected in either case of (1) when a state in which an average coverage, which is an average value of the document coverage based on the image data per a prescribed number of pages, is less than a predetermined first threshold value and a variation width of the average coverage is equal to or less than a predetermined second threshold value continues for a predetermined number of pages, (2) when a state in which the average coverage, which is the average value of the document coverage based on the image data per the prescribed number of pages is less than the predetermined first threshold value and a standard deviation of the document coverage calculated for a plurality of pages is equal to or less than a predetermined third threshold value continues for the predetermined number of pages, (3) when a state in which (1) and (2) are combined continues for the predetermined number of pages, or (4) when a change in the relative humidity in the image forming apparatus is equal to or greater than a predetermined fourth threshold value, and the hardware processor measures the charge amount of the developer when the determining that the sign is detected.

9. A non-transitory recording medium storing a computer readable control program for controlling an image forming apparatus including an image bearing member on which an electrostatic latent image is formed based on image data, and a developing section that contains a developer and develops the electrostatic latent image formed on the image bearing member with the developer to form a toner image, the computer readable control program for causing a computer to execute processing including:

a step (a) of detecting a sign that a charge amount of the developer contained in the developing section changes;

a step (b) of measuring the charge amount of the developer in accordance with a detection result in the step (a); and a step (c) of adjusting a charge amount change of the developer according to a measurement result in the step (b).

10. The non-transitory recording medium storing the computer readable control program according to claim 9 for causing a computer to execute processing further including:

a step (d) of measuring relative humidity in the image forming apparatus before the step (a), wherein in the step (a), the sign is detected using a measurement result in the step (d).

* * * * *